(12) United States Patent
Takagi

(10) Patent No.: US 9,050,724 B2
(45) Date of Patent: Jun. 9, 2015

(54) CONTROL METHOD OF ROBOT APPARATUS AND ROBOT APPARATUS

(71) Applicant: CANON KABUSHIKI KAISHA, Tokyo (JP)

(72) Inventor: Kiyoshi Takagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 223 days.

(21) Appl. No.: 13/722,382

(22) Filed: Dec. 20, 2012

(65) Prior Publication Data

US 2013/0211595 A1    Aug. 15, 2013

(30) Foreign Application Priority Data

Feb. 13, 2012   (JP) ................. 2012-028613

(51) Int. Cl.
    *G05B 15/00*  (2006.01)
    *B25J 9/16*   (2006.01)

(52) U.S. Cl.
    CPC ..... *B25J 9/1633* (2013.01); *G05B 2219/41387* (2013.01)

(58) Field of Classification Search
    CPC combination set(s) only.
    See application file for complete search history.

(56) References Cited

U.S. PATENT DOCUMENTS

| | | | | |
|---|---|---|---|---|
| 5,430,643 A | * | 7/1995 | Seraji | 700/263 |
| 5,648,709 A | * | 7/1997 | Maeda | 318/568.17 |
| 5,737,500 A | * | 4/1998 | Seraji et al. | 700/251 |
| 7,385,686 B2 | * | 6/2008 | Shiba et al. | 356/237.1 |
| 7,657,345 B2 | * | 2/2010 | Endo et al. | 700/249 |
| 2004/0172165 A1 | * | 9/2004 | Iribe et al. | 700/245 |
| 2004/0176875 A1 | * | 9/2004 | Iribe et al. | 700/245 |
| 2005/0113973 A1 | * | 5/2005 | Endo et al. | 700/245 |
| 2007/0013336 A1 | * | 1/2007 | Nowlin et al. | 318/568.21 |
| 2008/0207409 A1 | * | 8/2008 | Kadota | 482/122 |
| 2009/0287354 A1 | * | 11/2009 | Choi | 700/261 |
| 2012/0059518 A1 | * | 3/2012 | Lee et al. | 700/261 |
| 2012/0065778 A1 | * | 3/2012 | Lim et al. | 700/254 |
| 2012/0072026 A1 | * | 3/2012 | Takagi | 700/261 |
| 2012/0158179 A1 | * | 6/2012 | Ooga | 700/259 |
| 2012/0158182 A1 | * | 6/2012 | Lee et al. | 700/261 |
| 2012/0158183 A1 | * | 6/2012 | Lim et al. | 700/261 |
| 2012/0316682 A1 | * | 12/2012 | Seo et al. | 700/261 |
| 2013/0158712 A1 | * | 6/2013 | Lee et al. | 700/261 |
| 2013/0211595 A1 | * | 8/2013 | Takagi | 700/261 |
| 2013/0211596 A1 | | 8/2013 | Takagi | |

FOREIGN PATENT DOCUMENTS

JP    3436320 B2    8/2003

* cited by examiner

*Primary Examiner* — Jonathan L Sample
(74) *Attorney, Agent, or Firm* — Fitzpatrick, Cella, Harper & Scinto

(57) ABSTRACT

A control method of a robot apparatus, the robot apparatus including a link and a pair of actuators, obtaining each driving force command value of each of the actuators, and controlling each of the actuators, the control method including: a torque command value calculation step of using the target stiffness, the target trajectory, angular velocity of the target trajectory, and angular acceleration of the target trajectory to calculate a torque command value; a determination step of determining whether each of the driving force command values is a value 0 or greater; a change step of performing at least one of a change of increasing the target stiffness and a change of reducing the angular acceleration; and a driving force command value calculation step of using the target stiffness and the torque command value to calculate each of the driving force command values.

4 Claims, 17 Drawing Sheets

CONTROL METHOD OF ROBOT APPARATUS AND ROBOT APPARATUS

BACKGROUND OF THE INVENTION

1. Field of the Invention

The present invention relates to a control method of a robot apparatus including a hand that can flexibly touch an object and to the robot apparatus. The present invention can be applied to a working robot and a legged mobile robot.

2. Description of the Related Art

In a control method of a manipulator, it is becoming more important that a hand be able to flexibly touch an object. If the method is applied to an industrial robot, cooperative work of a robot apparatus and a human can be realized, and fitting work of components is facilitated by controlling the direction of the flexibility of the hand. If the method is applied to a legged mobile robot, impact on the body can be alleviated by soft landing, and absorption of a difference in level allows stable walking on an unleveled land.

To realize the control of the flexibility of the hand, impedance control for installing a force sensor on the hand or control using artificial muscle actuators is performed. Muscles of a human are known to serve as actuators, and at the same time, serve as a viscoelasticity-variable control mechanism. Among the artificial muscles, pneumatic rubber artificial muscles represented by McKibben artificial muscles particularly have similar viscoelasticity characteristics as those of the human muscles. Therefore, the control of the softness of artificial muscle actuators arranged on a manipulator allows touching an object at arbitrary flexibility of hand. However, the artificial muscle actuators are known to have difficulties in controllability for reasons that the viscoelasticity characteristics have non-linearity and that the actuators need to be antagonistically arranged and controlled because the force is generated only in a contraction direction.

Regarding this, disclosed is a technique for generating feedforward input for simultaneous control of a joint angle and flexibility of hand using a model of a manipulator with viscoelasticity characteristics of muscles and using a corrected value calculation unit (see Japanese Patent No. 3436320). In Japanese Patent No. 3436320, the model is used to output a joint angle and viscoelasticity coefficients of artificial muscle actuators at the time of control input, and the joint angle and a target value are compared. An error between the joint angle and the target value is back-propagated to the corrected value calculation unit to correct the feedforward input. Operation of providing the corrected feedforward input again to the model is repeated to gradually obtain the feedforward input.

In Japanese Patent No. 3436320, the joint angle and the flexibility of hand are simultaneously controlled by the feedforward control. However, the feedforward control input is obtained by repeatedly correcting the difference from the target value, and the amount of calculation required for the generation of the input is significantly large. Therefore, the computation needs to be repeated every time the target value of the joint angle or the flexibility of hand is changed, and there is a problem that much time is required to change the target value.

An object of the present invention is to provide a control method of a robot apparatus and the robot apparatus, the robot apparatus delivering a torque command value in a short time by a simple feedforward control system to realize simultaneous control of an angle of a joint and flexibility of a hand.

SUMMARY OF THE INVENTION

The present invention provides a control method of a robot apparatus, the robot apparatus including: a link pivotally connected to a base body through a joint; and a pair of actuators that generate driving force for pulling the link in opposite directions relative to the base body to provide torque to the joint based on a difference in the driving force and to provide stiffness to the joint based on a sum of the driving force, the robot apparatus causing the stiffness of the joint to coincide with target stiffness, the robot apparatus obtaining each driving force command value of each of the actuators necessary for a joint angle of the joint to follow a target trajectory, the robot apparatus controlling each of the actuators so that the driving force generated in each of the actuators coincides with each of the driving force command values, the control method including: a torque command value calculation step of using the target stiffness, the target trajectory, angular velocity of the target trajectory, and angular acceleration of the target trajectory to calculate a torque command value indicating the torque necessary for the joint based on inverse dynamics of the link; a determination step of determining whether each of the driving force command values, which is obtained using the torque command value calculated in the torque command value calculation step and using the target stiffness, is a value 0 or greater; a change step of performing at least one of a change of increasing the target stiffness and a change of reducing the angular acceleration of the target trajectory if it is determined that at least one of the driving force command values is a negative value in the determination step and returning to the torque command value calculation step; and a driving force command value calculation step of using the target stiffness and the torque command value to calculate each of the driving force command values if it is determined that each of the driving force command values is a value 0 or greater in the determination step.

According to the present invention, a torque command value can be delivered in a short time by a simple feedforward control system, and simultaneous control of an angle of a joint and flexibility of a hand can be realized.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
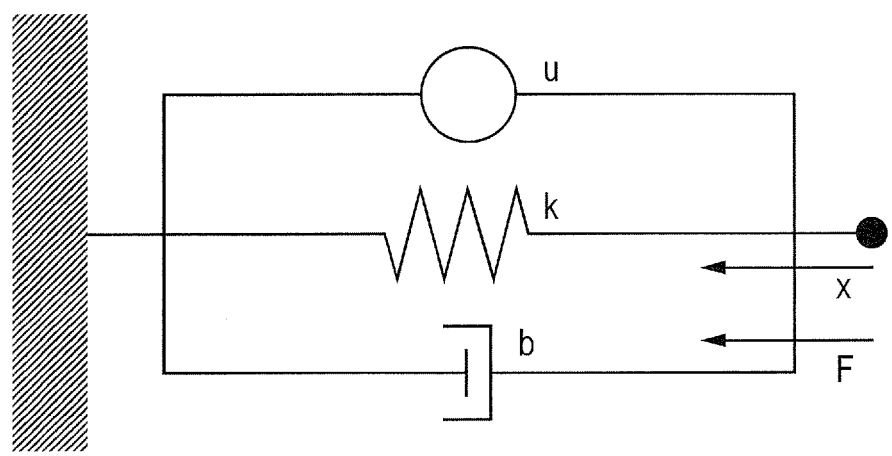
FIG. 1 is a diagram illustrating a viscoelasticity model of a muscle.

FIG. 1 is a diagram illustrating a viscoelasticity model of an actuator applied to a robot apparatus according to a first embodiment of the present invention. The present first embodiment describes an example of simultaneous control of a joint angle and stiffness of a joint of a manipulator using pneumatic artificial muscle actuators in a robot apparatus.

(1) Modeling

The artificial muscle actuator is an actuator with characteristics similar to characteristics called viscoelasticity of muscle. As illustrated in FIG. 1, the artificial muscle actuator is modeled using a force generation element, an elasticity element and a viscosity element. Contractile force of the force generation element is defined as u, and an amount of contraction of muscle is defined as x wherein a contraction direction is positive. The following formula denotes a contractile rate.

$$\dot{x}$$

An elastic force constant is defined as k, a viscous force constant is defined as b, and muscle contractile force is defined as F. In this case, viscoelasticity characteristics of muscle are modeled as follows.

$$F = u - kux - bu\dot{x} \qquad (1)$$

This provides a non-linear element in which elastic force and viscous force of muscle contractile force are proportional to the contractile force u of the force generation element.

Figure 2:
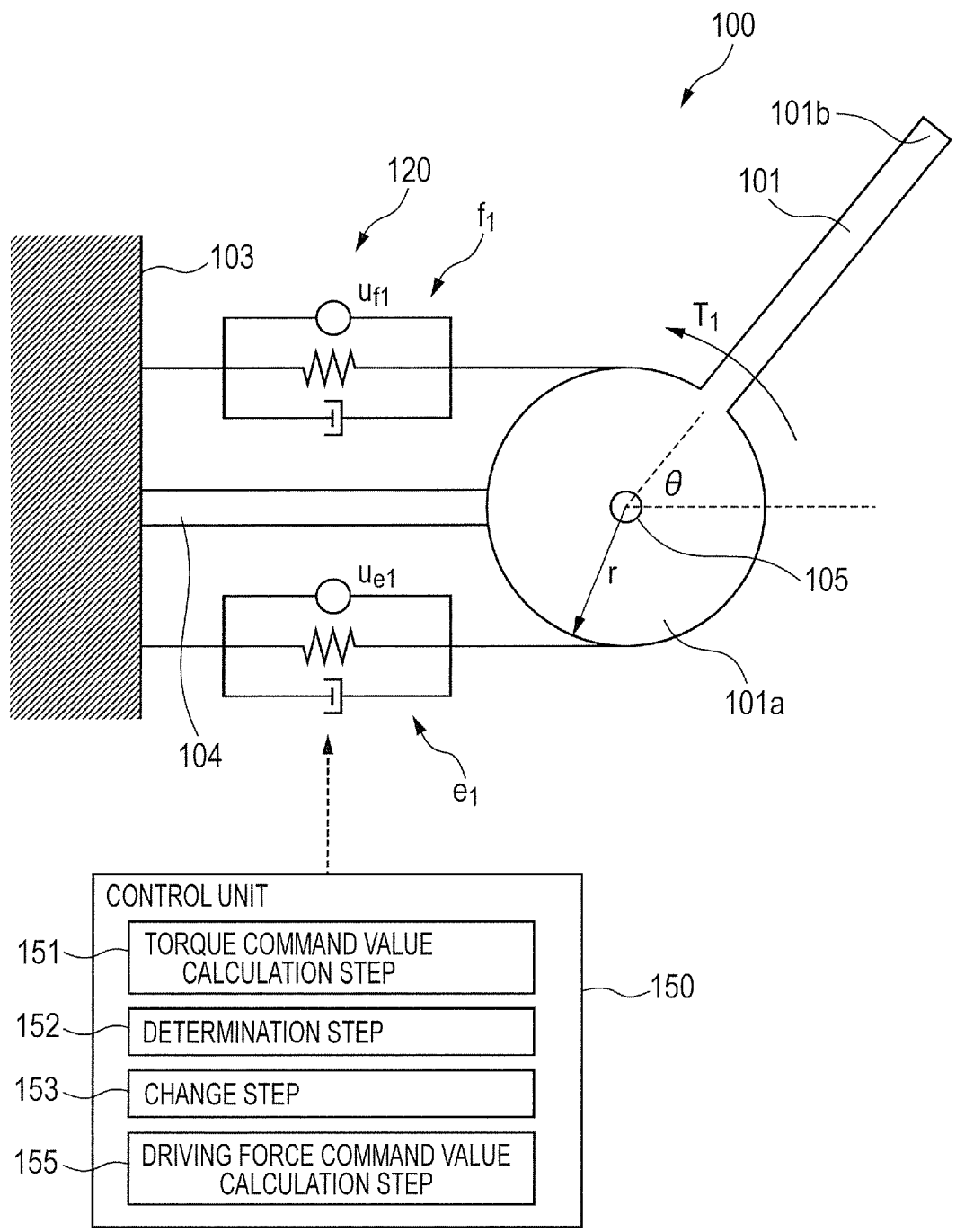
FIG. 2 is an explanatory view illustrating a schematic configuration of a robot apparatus according to a first embodiment of the present invention.

FIG. 2 illustrates a robot apparatus of the present first embodiment. A robot apparatus 100 illustrated in FIG. 2 is a so-called one-link manipulator and includes a link 101, a drive unit 120 with a pair of actuators $e_1$ and $f_1$, and a base body including a base member 103 and a rod-like arm member 104 extending from the base member 103. The link 101 is pivotally connected to the arm member 104 through a joint 105.

Although the base body includes the base member 103 and the arm member 104 as illustrated in FIG. 2 in the description of the present first embodiment, the arrangement is not limited to this. For example, the base body may be another link connected to a body of a legged mobile robot, connected to a pedestal of a working robot, or connected to the link 101.

The actuators $e_1$ and $f_1$ are mono-articular muscle actuators. One end is connected to the base member 103 as the base body, and the other end is connected to a base end 101a of the link 101. The actuators $e_1$ and $f_1$ are antagonistically arranged to swing the link 101 based on a difference in driving force (contractile force). Therefore, the actuators $e_1$ and $f_1$ are symmetrically arranged on both sides of the link 101 across the link 101.

The robot apparatus 100 includes a control unit 150 that sets the driving force of the actuators $e_1$ and $f_1$ based on driving force command values to control operation of the link 101.

The actuators $e_1$ and $f_1$ are pneumatic artificial muscle actuators illustrated in FIG. 1. The artificial muscle actuators generate force only in the contraction direction. Therefore, the actuators are antagonistically arranged as illustrated in FIG. 2 to position the joint 105 at an arbitrary angle. Thus, the actuators $e_1$ and $f_1$ generate driving force that pulls the link 101 in opposite directions relative to the base member. Since the actuators $e_1$ and $f_1$ are mono-articular muscle actuators made of artificial muscles, the driving force is generated by contraction. Therefore, the contractive force of the actuators $e_1$ and $f_1$ coincides with the driving force.

The driving force (contractile force) of force generation elements of the antagonistically arranged actuators $e_1$ and $f_1$ are defined as $u_{e1}$ and $u_{f1}$, respectively. An angle of the link 101 relative to the arm member 104, i.e. an angle of the joint 105 is defined as θ, and inertia moment of the link 101 is defined as I. A moment arm diameter of the link 101, i.e. a length between a pivot center point of the link 101 and a connection point of the actuators $e_1$ and $f_1$ at the link 101, is defined as r. The following Formula (2) denotes an equation of motion.

$$I\ddot{\theta} = (u_{f1} - u_{e1})r - (u_{f1} + u_{e1})kr^2\theta - (u_{f1} + u_{e1})br^2\dot{\theta} \qquad (2)$$

It can be recognized that a difference between the contractile force $u_{e1}$ and $u_{f1}$ in the first term on the right side of Formula (2) provides rotation torque to the joint 105, and a sum of the contractile force $u_{e1}$ and $u_{f1}$ in the second and third terms on the right side changes the stiffness and the viscosity relative to the joint 105. Therefore, the actuators $e_1$ and $f_1$ provide torque to the joint 105 based on the difference in the driving force and provides stiffness to the joint 105 based on the sum of the driving force.

(2) Control System Design

The control unit 150 executes a torque command value calculation step 151, a determination step 152, a change step 153 and a driving force command value calculation step 155. An object of the present first embodiment is to provide feedforward control input for the execution of the driving force command value calculation step 155 of calculating the driving force command values $u_{e1}$ and $u_{f1}$ to thereby cause the angle of the joint 105 to follow a target trajectory and to control the stiffness of the joint 105 at the same time. The target trajectory of the joint 105 is defined as $r_a$, and the target stiffness is defined as $r_s$. The control unit 150 calculates the driving force command values $u_{e1}$ and $u_{f1}$ of the actuators $e_1$ and $f_1$ necessary to cause the stiffness of the joint 105 to coincide with the target stiffness $r_s$ and to cause the angle θ of the joint 105 to follow the target trajectory $r_a$. The control unit 150 controls the actuators $e_1$ and $f_1$ to cause the driving force generated in the actuators $e_1$ and $f_1$ to be equal to the driving force command values $u_{e1}$ and $u_{f1}$.

(2.1) Feedforward Control System Design

In this section, a delivery method of the feedforward input provided to the actuators $e_1$ and $f_1$ will be described. As described below, the difference between the driving force command values $u_{e1}$ and $u_{f1}$ multiplied by the moment arm diameter r is defined as $T_1$, and the joint stiffness command value indicating the sum (total value) of the driving force command values $u_{e1}$ and $u_{f1}$ is defined as $$(U_{f1} - u_{e1})r = T_1 \quad (3)$$

$$u_{f1} + u_{e1} = U_1 \quad (4)$$

Based on this, Formula (2) is expressed as follows.

$$I\ddot{\theta} = T_1 - U_1 k r^2 \theta - U_1 b r^2 \dot{\theta} \quad (5)$$

It can be recognized that $T_1$ provides torque to the joint 105 and that $U_1$ increases or decreases the stiffness and the viscosity relative to the joint 105. Since the target stiffness of the joint 105 is $r_s$, $U_1$ is determined as follows.

$$U_1 = r_s / k r^2 \quad (6)$$

Angular velocity and angular acceleration of the target trajectory $r_a$ are expressed by $$\dot{r}_a, \ddot{r}_a$$

or $r_a'$ and $r_a''$, respectively.

The feedforward torque (torque command value) $T_1$ for causing the angle θ of the joint 105 to follow the target trajectory $r_a$ is obtained by the following Formula (7) based on inverse dynamics of the link 101.

$$T_1 = I\ddot{r}_a + U_1 k r^2 r_a + U_1 b r^2 \dot{r}_a \quad (7)$$

Therefore, to calculate driving force command values that simultaneously satisfy the torque command value $T_1$ and the joint stiffness command value $U_1$ as the sum of the driving force command values, Formulas (3) and (4) are solved for $u_{e1}$ and $u_{f1}$ to determine as follows.

$$u_{f1} = \frac{U_1 + T_1/r}{2}, u_{e1} = \frac{U_1 - T_1/r}{2} \quad (8)$$

However, since the artificial muscle actuators $e_1$ and $f_1$ generate force only in the contraction direction, the following conditions need to be simultaneously satisfied.

$$u_{f1} > 0, u_{e1} > 0 \quad (9)$$

Based on Formulas (8) and (9), the following conditions can be obtained.

$$T_1/r < U_1, T_1/r > -U_1 \quad (10)$$

Therefore, the torque command value $T_1$ needs to satisfy the following condition.

$$|T_1| < U_1 r \quad (11)$$

Figure 3:
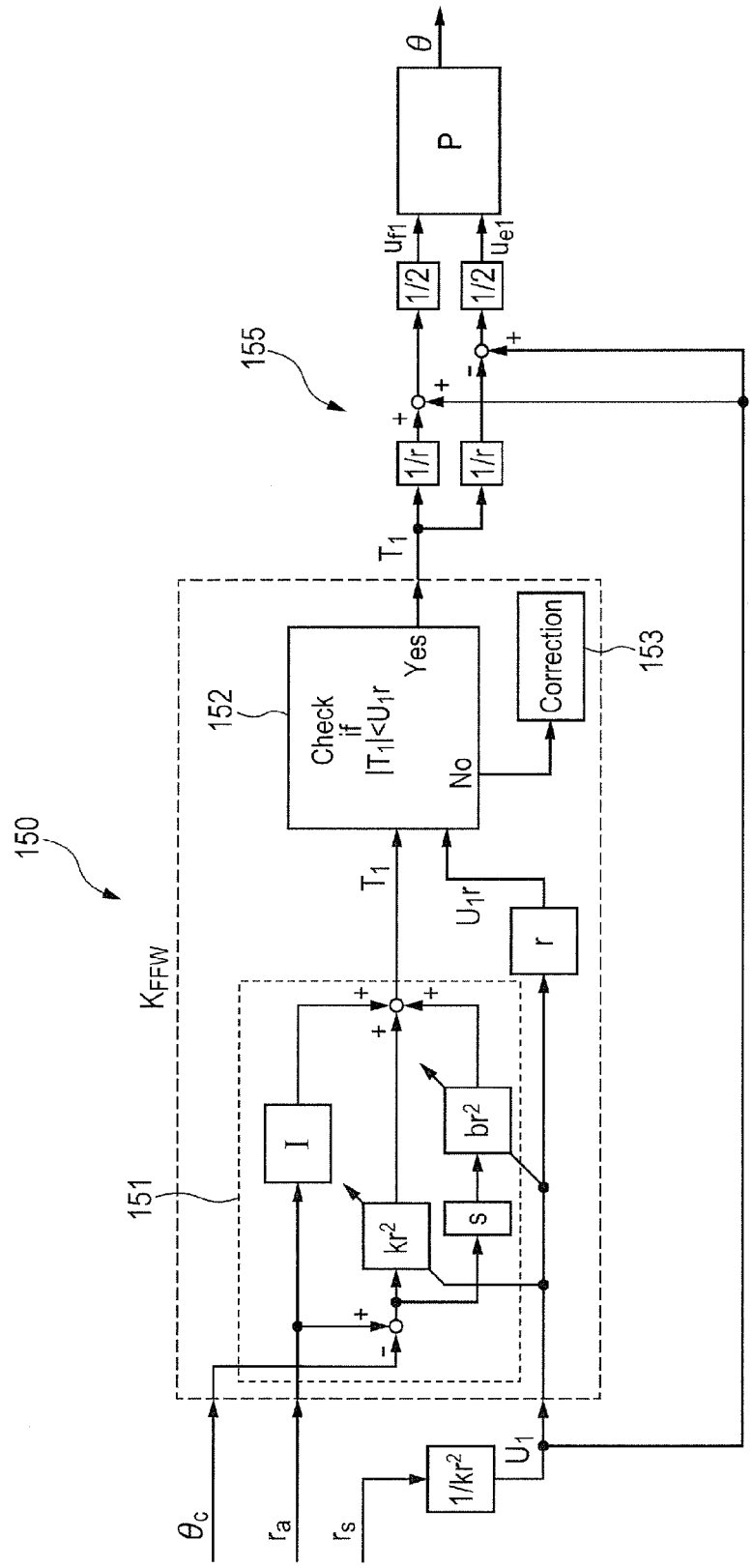
FIG. 3 is a block diagram of a control unit according to the first embodiment of the present invention.

FIG. 3 illustrates a block diagram of the control unit 150 according to the present first embodiment. In the torque command value calculation step 151, the control unit 150 uses the target stiffness $r_a'$ the target trajectory $r_a$, the angular velocity $r_a'$ of the target trajectory, and the angular acceleration $r_a''$ of the target trajectory based on inverse dynamics of the link 101 to calculate the torque command value $T_1$ indicating the torque necessary for the joint 105. Therefore, the control unit 150 calculates the joint stiffness command value $U_1$ from the target stiffness $r_s$ according to Formula (6). The control unit 150 then uses the joint stiffness command value $U_1$, the target trajectory $r_a$, the angular velocity $r_a'$ of the target trajectory, and the angular acceleration $r_a''$ of the target trajectory to calculate the torque command value $T_1$ according to Formula (7) (torque command value calculation step).

In the determination step 152, the control unit 150 determines whether the driving force command values obtained using the torque command value $T_1$ and the target stiffness $r_s$ calculated in the torque command value calculation step 151 can be values 0 or greater (determination step). More specifically, the control unit 150 determines whether Formula (11) is satisfied as a condition for satisfying Formula (9).

In the driving force command value calculation step 155, if the control unit 150 determines that the driving force command values can be values 0 or greater in the determination step 152, the control unit 150 uses the target stiffness $r_s$ and the torque command value $T_1$ to calculate the driving force command values $u_{e1}$ and $u_{f1}$ (driving force command value calculation step).

More specifically, if the control unit 150 determines that Formula (11) is satisfied, the control unit 150 obtains the feedforward input for the actuators $e_1$ and $f_1$, i.e. the driving force command values $u_{e1}$ and $u_{f1}$, based on Formula (8). As a result, the stiffness of the joint 105 coincides with the target stiffness $r_s$. At the same time, torque corresponding to the torque command value $T_1$ is applied to the joint 105, and the angle θ of the joint 105 follows the target trajectory $r_a$.

In the change process 153, if the control unit 150 determines that at least one of the driving force command values can be a negative value in the determination step 152, the control unit 150 performs at least one of a change of increasing the target stiffness r, and a change of reducing the angular acceleration $r_a''$ of the target trajectory (change step). After the execution of the change process 153, the control unit 150 returns to the execution of the torque command value calculation step 151 (change step).

More specifically, if the condition of Formula (11) is not satisfied, the control unit 150 performs a change of reducing the maximum value of the angular acceleration $r_a''$ of the target trajectory or increasing the target stiffness $r_s$ of the joint 105 to deliver the torque command value $T_1$ and check Formula (11) again.

In FIG. 3, $K_{FFW}$ surrounded by dashed lines indicates Formula (7). A block of the determination step 152 indicated by "Check" is a block for checking the satisfaction condition of the feedforward input illustrated in Formula (11).

A block of the change process 153 indicated by "Correction" is a block for delivering the torque command value $T_1$ again. A process executed by the Correction block is illustrated in a flow chart of FIG. 4.

The control unit 150 first stops the generation of the feedforward input (S1) and determines whether the target trajectory $r_a$ can be changed (S2). An amount of change of the joint stiffness command value $U_1$ is defined as $\xi_U$, and an amount of change of the angular acceleration $r_a''$ of the target trajectory is defined as $\xi_a$.

If the control unit 150 determines that the target trajectory $r_a$ can be changed (S2: Yes), the control unit 150 subtracts the amount of change $\xi_a$ from the angular acceleration $r_a''$ to change the angular acceleration $r_a''$ (S4). The control unit 150 regenerates the target trajectory $r_a$ based on the change in the angular acceleration $r_a''$ (S5). The control unit 150 recalculates the feedforward input (S6).

If the control unit 150 determines that the target trajectory $r_a$ cannot be changed (S2: No), the control unit 150 increases the amount of change from the joint stiffness command value $U_1$ to change the joint stiffness command value $U_1$ (S7). The control unit 150 recalculates the feedforward input (S6).

Figure 4:
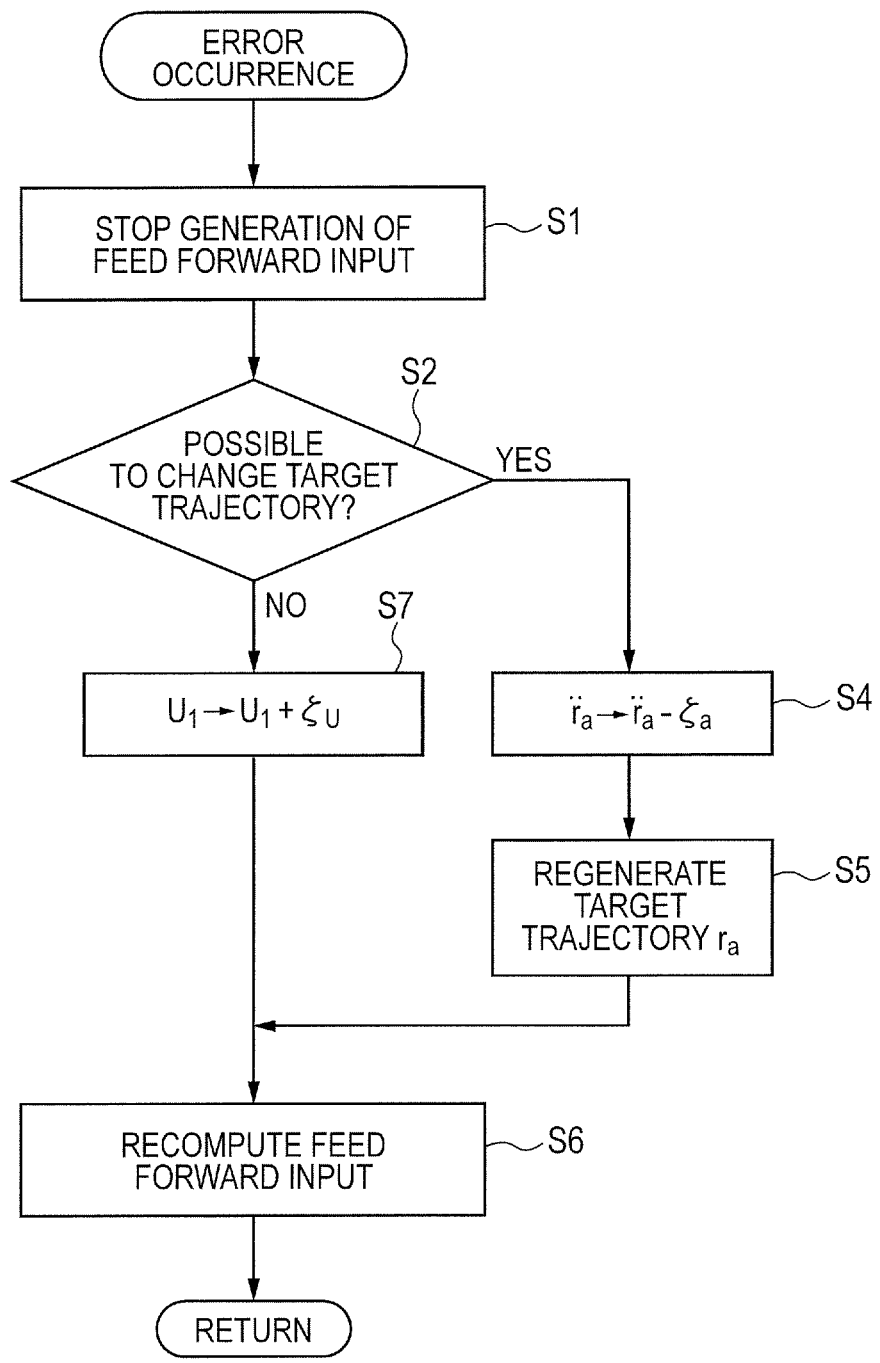
FIG. 4 is a flow chart illustrating a delivery method of control input according to the first embodiment of the present invention.

If the amount of change $\xi_U$ or $\xi_a$ is set to a large value, such as 0.5 $U_1$ and 0.5 $r_a''$, the delivery of the feedforward input illustrated in Formula (7) and the process illustrated in FIG. 4 can be performed several times to generate the feedforward input in a short time. Alternatively, the right side and the left side of Formula (11) can be illustrated on the same drawing to adjust $\xi_U$ or $\xi_a$ while checking the satisfaction condition to generate the feedforward input in a short time.

Although the joint stiffness command value $U_1$, i.e. one of the target stiffness $r_s$ and the angular acceleration $r_a''$, is changed in the present first embodiment, both may also be changed.

In the delivery described above, it is assumed that the elastic force of muscle is generated in proportion to the angle from θ=0 deg. To generate the feedforward control input with an arbitrary angle as a reference angle (hereinafter, "neutral angle") of the generation of the elastic force of muscle, the following formula can be used in place of Formula (7), wherein $\theta_c$ denotes the neutral angle.

$$T_1 = I\ddot{r}_a + U_1 k r^2 (r_a - \theta_c) U_1 b r^2 \dot{r}_a \quad (12)$$

(2.2) Trajectory Design

Figure 5A:
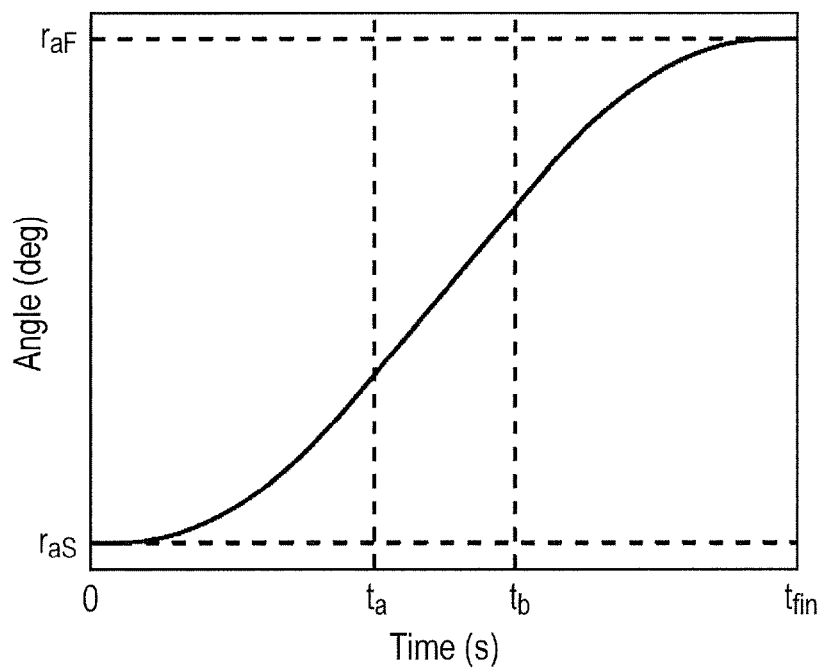
FIG. 5A is a diagram illustrating a simulation result according to the first embodiment of the present invention.
Figure 5B:
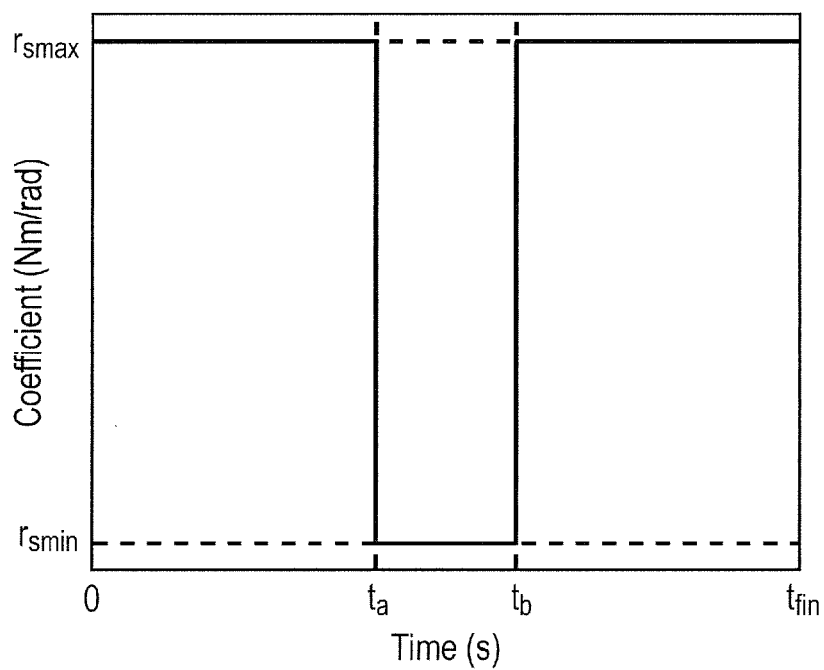
FIG. 5B is a diagram illustrating a simulation result according to the first embodiment of the present invention.

A design method of the target trajectory $r_a$ and the target stiffness $r_s$ of the joint 105 will be illustrated. In the present first embodiment, a trajectory including an acceleration section, a constant velocity section, and a deceleration section as illustrated in FIG. 5A is used for the target trajectory $r_a$. Here, $r_{aS}$ and $r_{aF}$ denote an initial angle and a target angle of the trajectory, respectively. Furthermore, $t_a$, $t_b$ and $t_{fin}$ denote a start time of the constant velocity section, an end time of the constant velocity section, and a positioning end time, respectively. As illustrated in FIG. 5B, the target stiffness $r_s$ is set to be high stiffness $r_{smax}$ at the acceleration and deceleration sections and low stiffness $r_{smin}$ at the constant velocity. As a result of the variations in the stiffness, the manipulator is accelerated by the elastic force of muscle at the start of the drive and is driven almost solely by the inertia force at the constant velocity section due to the low stiffness. As a result, the drive is possible by small contractile force of muscle.

Although the trajectory including the acceleration section, the constant velocity section and the deceleration section is used in the present first embodiment, a trajectory without the constant velocity section, such as a minimum jerk trajectory, may also be used. Besides, the target stiffness may be constant if the efficiency of drive is not taken into account.

(3) Simulation

A simulation using the control system of the previous section is performed. The inertia moment of the link 101 is defined by I=8.3×10$^{-2}$ kgm$^2$, and the moment arm diameter is defined by r=0.1 m. The elastic force and viscous force constants are defined by k=25 and b=3. As for the target trajectory $r_a$, the initial angle is defined by $r_{aS}$=-20 deg, the target angle is defined by $r_{aF}$=20 deg, the start time of the constant velocity section is defined by $t_a$=0.4 sec, the end time of the constant velocity section is defined by $t_b$=0.6 sec, and the positioning end time is defined by $t_{fin}$=1 sec. The target stiffness of the joint is defined by $r_{smax}$=2.3 kr$^2$Nm/rad and $r_{smin}$=0.8 kr$^2$Nm/rad. Since k and r are constants, the sum $U_1$ of the contractile force can be controlled so that $U_1$ equals to 2.3 at the acceleration and deceleration sections and $U_1$ equals to 0.8 at the constant velocity section. Here, $U_1$ is designed to satisfy the condition illustrated in Formula (11) in the flow illustrated in FIG. 4.

Figure 6A:
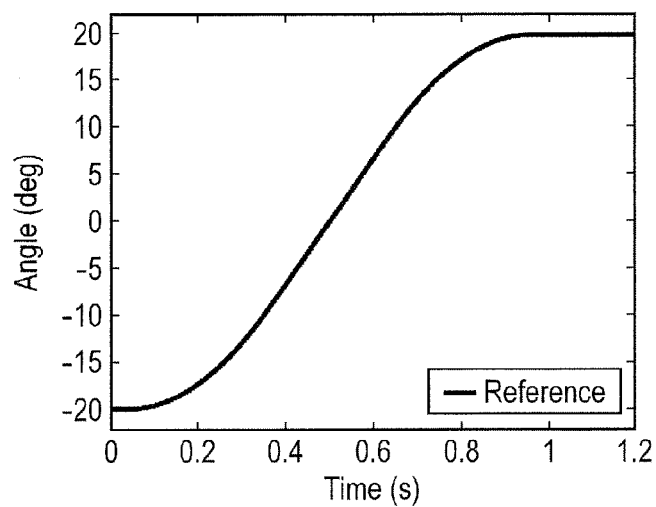
FIG. 6A is a diagram illustrating a simulation result according to the first embodiment of the present invention.
Figure 6B:
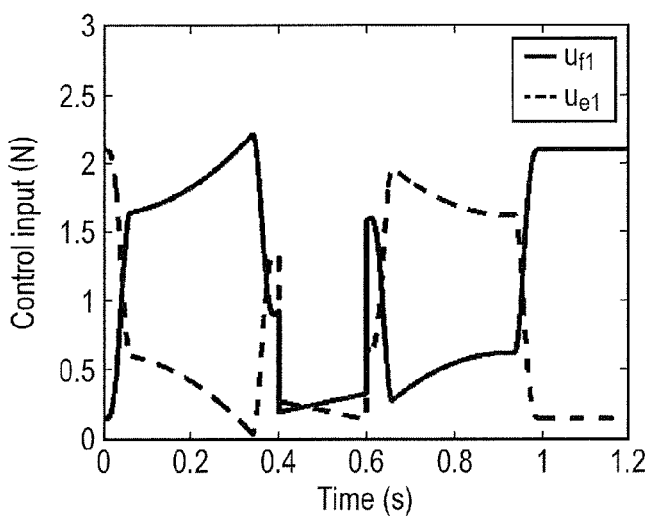
FIG. 6B is a diagram illustrating a simulation result according to the first embodiment of the present invention.
Figure 6C:
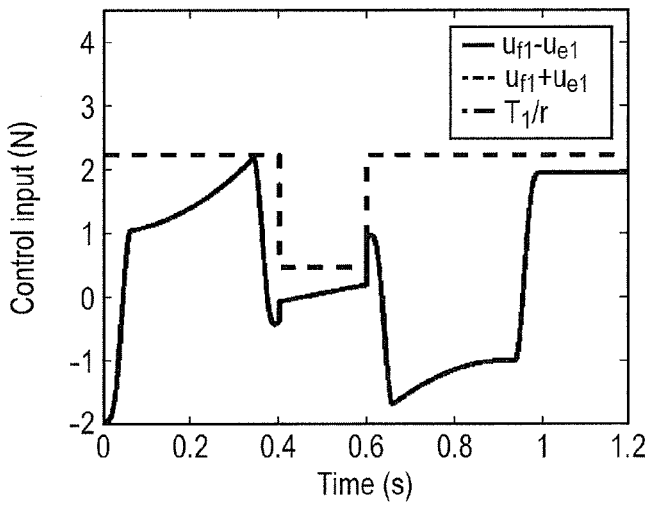
FIG. 6C is a diagram illustrating a simulation result according to the first embodiment of the present invention.

FIG. 6A illustrates the angle θ and the target trajectory $r_a$ of the joint 105 by a solid line and a dashed line, respectively. FIG. 6B illustrates responses of the driving force command values $u_{e1}$ and $u_{f1}$ by a solid line and a dashed line, respectively. FIG. 6C illustrates the difference between the driving force command values $u_{e1}$ and $u_{f1}$ by a solid line, the sum by a dashed line, and a response of $T_1/r$ by an alternate long and short dash line.

It can be recognized from FIG. 6A that the joint angle indicated by the solid line overlaps with the trajectory illustrated by the dashed line and that the joint follows the target trajectory. It can be recognized from FIG. 6B that the characteristic that the contractile force of the artificial muscle can only be a positive value is satisfied, because the driving force command values $u_{e1}$ and $u_{f1}$ are obtained by distributing the control input $T_1$ of the feedforward control system based on the conditions illustrated in Formulas (8) and (11).

In FIG. 6C, $u_{f1}$-$u_{e1}$ indicated by the solid line overlaps with $T_1/r$ indicated by the alternate long and short dash line, and the condition of Formula (3) is satisfied. Furthermore, u indicated by the dashed line is 2.3 at the acceleration and deceleration sections and is 0.8 at the constant velocity section. It can be recognized that the stiffness of the joint is controlled at the target value. According to the method of the present first embodiment, it can be recognized that the feedforward input (torque command value) that controls the stiffness of the joint arbitrarily can be simply generated while realizing the following of the target trajectory.

Second Embodiment

A robot apparatus according to a second embodiment of the present invention will be described. In the present second embodiment, control operation by a control unit is different from the control operation by the control unit of the first embodiment. In the configuration of the main body of the robot apparatus, components with similar configurations as those of the main body of the robot apparatus of FIG. 1 described in the first embodiment are designated with the same reference numerals, and the detailed description is omitted.

The present second embodiment delivers a two-degree-of-freedom control system merging the feedforward control system illustrated in the first embodiment and a feedback control system. As with the feedforward control system, the feedback control system is delivered to allow simultaneous control of the following of the target trajectory and the joint stiffness. With only the feedforward control system, the control performance is reduced if there is an identification error in a parameter such as the inertia moment of the link 101. However, it will be illustrated that the configuration of the two-degree-of-freedom control system with the feedback control system allows simultaneous control of the following of the target trajectory and the joint angle, even if there is a model error.

(1) Modeling

A model used in the present second embodiment is the same as that of the first embodiment.

(2) Control System Design

The delivery of the feedforward control system is similar to that of the first embodiment. The joint torque delivered by Formula (7) is described as $T_{FFW1}$ in the present second embodiment.

Figure 7:
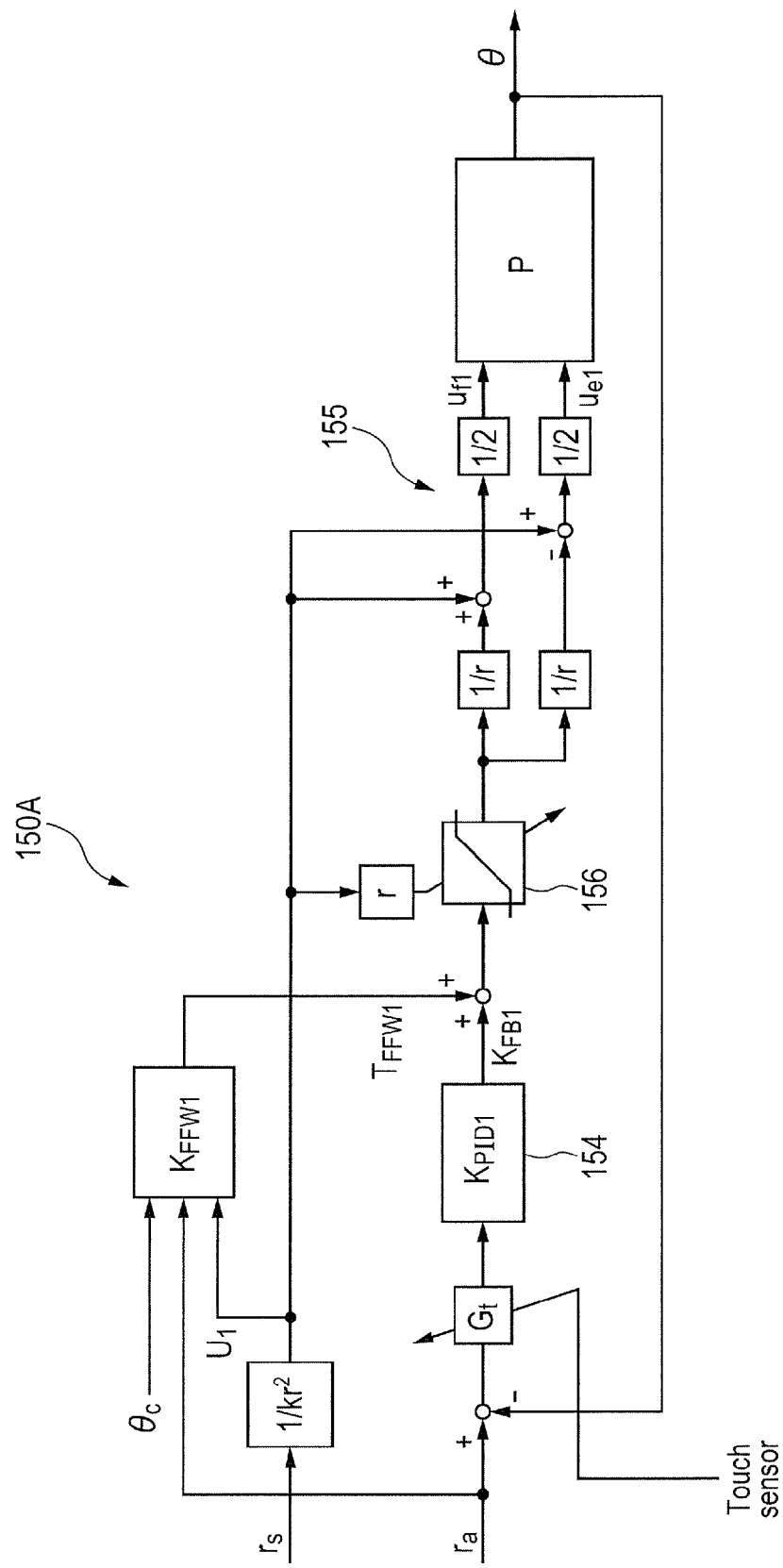
FIG. 7 is a block diagram of a control unit according to a second embodiment of the present invention.

FIG. 7 illustrates a block diagram of a control unit 150A according to the present second embodiment. The section surrounded by the dashed lines in the feedforward control system illustrated in FIG. 3 is indicated by $K_{FFW1}$ in FIG. 7.

Other than the feedforward control system $K_{FFW1}$, the control unit 150A has a function of executing a PID control step $K_{PID1}$ as a corrected torque command value calculation step 154 which is the feedback control system. In the PID control step $K_{PID1}$, the control unit 150A calculates control input torque $T_{FB1}$ as a corrected torque command value for compensating the difference between the angle θ and the target trajectory $r_a$ of the joint 105 (corrected torque command value calculation step).

Based on Formula (2), if the driving force command values $u_{e1}$ and $u_{f1}$ are determined to satisfy $$(u_{f1} - u_{e1})r = T_{FFW1} + T_{FB1} = T'_1 \quad (13),$$

$T'_1$ as a sum of the feedforward control torque $T_{FFW1}$ and the feedback control torque $T_{FB1}$ can be provided to the joint 105. The torque command value $T'_1$ denotes a computation result obtained by adding the control input torque $T_{FB1}$ calculated in the PID control step $K_{PID1}$ to the torque command value $T_{FFW1}$ calculated in the torque command value calculation step 151 (see FIG. 3) of the feedforward control system $K_{FFW1}$.

Therefore, in the present second embodiment, the torque command value $T'_1$ is used as a torque command value used to calculate the driving force command values in the execution of the driving force command value calculation step 155.

As in the first embodiment, the driving force command values $u_{e1}$ and $u_{f1}$ need to be determined to simultaneously satisfy the following conditions related to the stiffness of the joint 105.

$$U_1 = u_{f1} + u_{e1} = r_s/kr^2 \quad (14)$$

To simultaneously satisfy the torque command value $T'_1$ and the joint stiffness command value $U_1$, Formulas (13) and (14) can be solved for the driving force command values $u_{e1}$ and $u_{f1}$ to determine as follows.

$$u_{f1} = \frac{U_1 + T'_1/r}{2}, \; u_{e1} = \frac{U_1 - T'_1/r}{2} \quad (15)$$

However, the artificial muscle actuators $e_1$ and $f_1$ generate force only in the contraction direction. Therefore, as in the first embodiment, $T'_1$ needs to satisfy the following condition.

$$-U_1 r < T'_1 < U_1 r \quad (16)$$

As a result, the stiffness of the joint 105 coincides with the target stiffness $r_s$, and at the same time, the joint 105 is positioned at the target angle $r_a$ based on the torque command value $T_1$. As illustrated in the block diagram of FIG. 7, the control unit 150A can execute a restriction process 156 of restricting the control input as follows to realize Formula (16).

$$|T'_1| < U_1 r \quad (17)$$

Alternatively, there is a method of changing the gain of the PID control step $K_{PID1}$ to set the size of the control input within the range of Formula (16).

However, if the gain of the feedback control system is high, the stiffness of the joint 105 becomes dominant.

Therefore, as illustrated in FIG. 7, the control unit 150A introduces a touch gain $G_t$. If there is a touch, $G_t=0$ is set to cut off the feedback system. As a result, the stiffness of the link 101 (joint 105) can be quickly switched to the target stiffness $r_s$ at arbitrary time, such as at the detection of contact to a human or an object by the hand.

In the present second embodiment, a transfer function used in the PID control step $K_{PID1}$ is as follows.

$$K_{PID1}(s) = \left(25 + \frac{7}{s} + \frac{5s}{1/(100 \times 2 \times \pi)s\,1}\right) \quad (18)$$

(3) Simulation

The control system delivered in the previous section is used to perform a simulation. It is assumed that the parameters of the link 101 and the target trajectory $r_a$ are similar to those of the first embodiment. In the present second embodiment, to verify the identification error of the model, the inertia moment of the link 101 is set to I'=1.05 I, and a model with an error relative to the model at the generation of the feedforward input is used for the simulation.

Figure 8A:
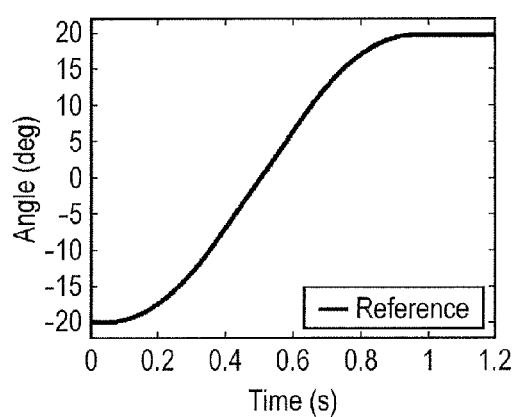
FIG. 8A is a diagram illustrating a simulation result according to the second embodiment of the present invention.
Figure 8B:
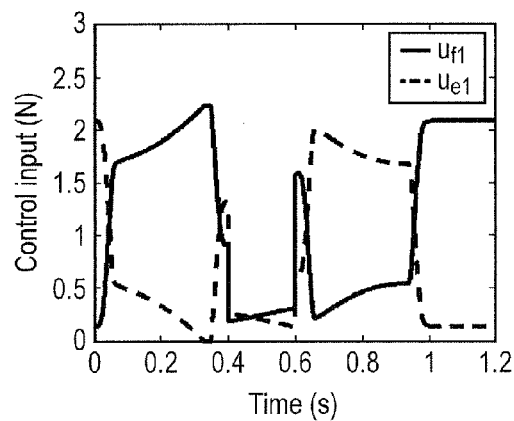
FIG. 8B is a diagram illustrating a simulation result according to the second embodiment of the present invention.
Figure 8C:
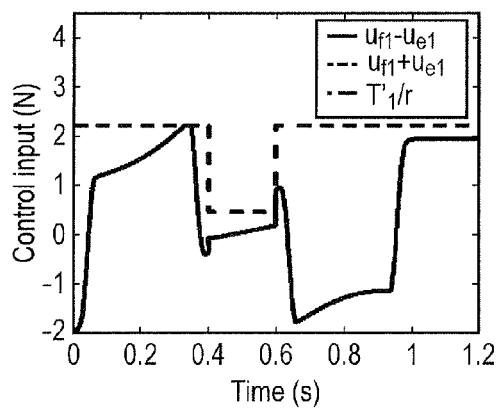
FIG. 8C is a diagram illustrating a simulation result according to the second embodiment of the present invention.
Figure 8D:
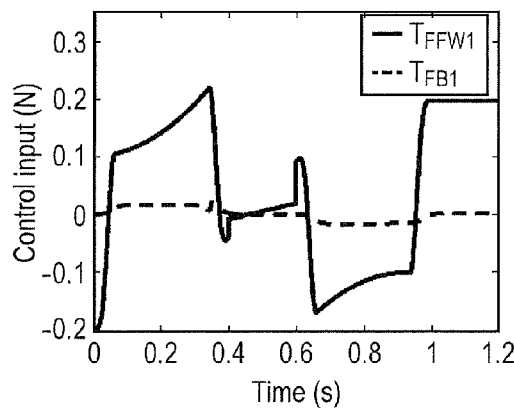
FIG. 8D is diagram illustrating a simulation result according to the second embodiment of the present invention.

FIG. 8A illustrates the angle θ and the target trajectory $r_a$ of the joint 105 by a solid line and a dashed line, respectively. FIG. 8B illustrates responses of the driving force command values $u_{e1}$ and $u_{f1}$ by a solid line and a dashed line, respectively. FIG. 8C illustrates the difference between the driving force command values $u_{e1}$ and $u_{f1}$ by a solid line, the sum by a dashed line, and the response of $T'_1/r$ by an alternate long and short dash line. FIG. 8D illustrates the torque command values $T_{FFW1}$ and $T_{FB1}$ by a solid line and a dashed line, respectively.

It can be recognized from FIG. 8A that the angle θ of the joint 105 indicated by the solid line overlaps with the target trajectory $r_a$ indicated by the dashed line and that the joint 105 follows the target trajectory $r_a$. The trajectory cannot be followed only by the feedforward control system due to the model error. However, the feedback control input compensates the model error as illustrated by the dashed line of FIG. 8D, and the trajectory can be followed. It can be recognized from FIG. 8B that driving force command values $u_{e1}$ and $u_{f1}$ satisfy the characteristic that the contractile force of the artificial muscle can only be a positive value, because the control input $T'_1$ of the two-degree-of-freedom control system is distributed based on the conditions illustrated in Formulas (15) and (17). In FIG. 8C, $u_{f1} - u_{e1}$ indicated by the solid line overlaps with $T'_1/r$ indicated by the alternate long and short dash line, and the condition of Formula (13) is satisfied. As in the first embodiment, u indicated by the dashed line is 2.3 at the acceleration and deceleration sections and is 0.8 at the constant velocity section. It can be recognized that the stiffness of the joint 105 is controlled by the target stiffness $r_s$. Using the two-degree-of-freedom control system illustrated in the present second embodiment, it can be recognized that the stiffness of the joint 105 can be freely changed while realizing the following of the target trajectory $r_a$, even if there is an identification error in the model.

Third Embodiment

Figure 9:
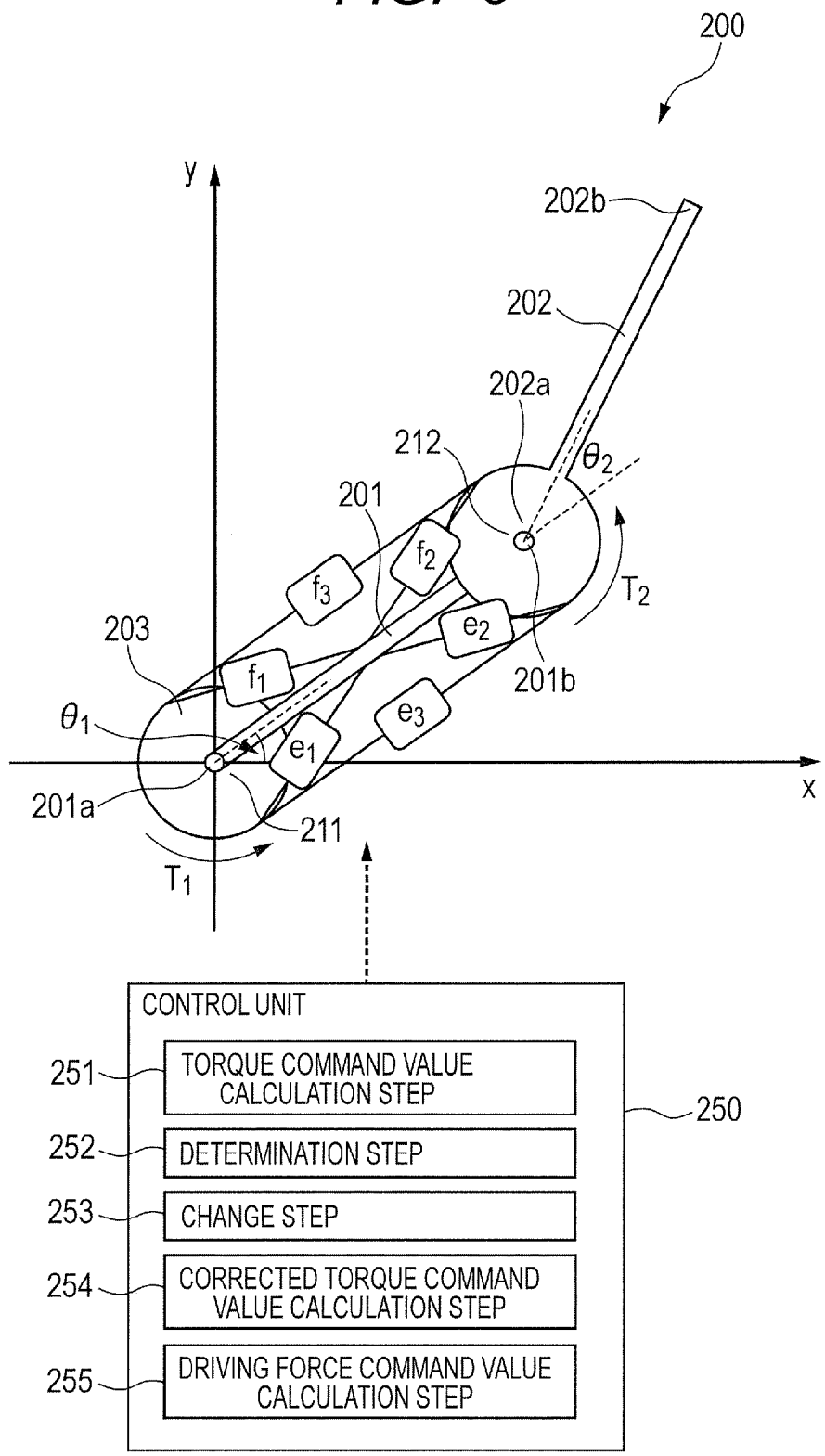
FIG. 9 is an explanatory view illustrating a schematic configuration of a robot apparatus according to a third embodiment of the present invention.

A robot apparatus according to a third embodiment of the present invention will be described in detail. FIG. 9 is an explanatory view illustrating a schematic configuration of the robot apparatus according to the third embodiment of the present invention. The present third embodiment describes an example of control of hand stiffness of a robot apparatus 200 as a two-link manipulator with three pairs (six muscles) of artificial muscle actuators.

(1) Modeling

The robot apparatus 200 illustrated in FIG. 9 includes a pulley 203, a first link 201 pivotally connected to the pulley 203 through a first joint 211, and a second link 202 pivotally connected to the first link 201 through a second joint 212.

The first link 201 is made of a longitudinal member, and a base end 201a of the first link 201 is pivotally supported by the pulley 203 in a plane of an x-y rectangular coordinate system (hereinafter, called "work plane"). The second link 202 is made of a longitudinal member, and a base end 202a of the second link 202 is pivotally supported by a tip 201b of the first link 201 in the work plane.

A tip (hereinafter, called "link tip") 202b of the second link 202 includes an end effector (for example, hand) not illustrated. More specifically, the first link 201 is arranged between the first joint 211 and the second joint 212 and is pivotally supported by the first joint 211. The second link 202 is pivotally supported by the second joint 212.

In the present second embodiment, the pulley 203 serves as the base body of the first link 201, and the first link 201 serves as the base body of the second link 202. The pulley 203 is arranged on, for example, the robot body.

The robot apparatus 200 includes a pair of first actuators $e_1$ and $f_1$, a pair of second actuators $e_2$ and $f_2$, and a pair of third actuators $e_3$ and $f_3$. One end of each of the first actuators $e_1$ and $f_1$ is connected to the pulley 203, and the other end is connected to a center section in the longitudinal direction of the first link 201. The first actuators $e_1$ and $f_1$ are antagonistically arranged so that the first link 201 pivots based on the difference in the driving force.

One end of each of the second actuators $e_2$ and $f_2$ is connected to the center section in the longitudinal direction of the first link 201, and the other end is connected to the base end 202a of the second link 202. The second actuators $e_2$ and $f_2$ are antagonistically arranged so that the second link 202 pivots based on the difference in the driving force. One end of each of the third actuators $e_3$ and $f_3$ is connected to the pulley 203, and the other end is connected to the base end 202a of the second link 202. The third actuators $e_3$ and $f_3$ are antagonistically arranged so that the first link 201 and the second link 202 pivot based on the difference in the driving force. More specifically, the first actuators $e_1$ and $f_1$ are symmetrically arranged on both sides of the first link 201 across the first link 201. The second actuators $e_2$ and $f_2$ are symmetrically arranged on both sides of the first link 201 across the first link 201. The third actuators $e_3$ and $f_3$ are symmetrically arranged on both sides of the first link 201 across the first link 201.

The robot apparatus 200 further includes a control unit 250 that sets the driving force of the actuators $e_1$, $f_1$, $e_2$, $f_2$, $e_3$ and $f_3$ based on driving force command values to control the operations of the links 201 and 202.

The first actuators $e_1$ and $f_1$ are first mono-articular drive actuators that drive the first link 201. The second actuators $e_2$ and $f_2$ are second mono-articular drive actuators that drive the second link 202. The third actuators $e_3$ and $f_3$ are bi-articular simultaneous drive actuators that simultaneously drive the first link 201 and the second link 202. Upper arms and thighs of humans are known to include bi-articular simultaneous drive actuators called bi-articular muscles. However the muscle arrangement of the extremities of humans is complicated, an effective muscle concept is introduced, and a two-link model with six muscles (three pairs) is presented.

The actuators $e_1$, $f_1$, $e_2$, $f_2$, $e_3$ and $f_3$ are artificial muscle actuators with viscoelasticity characteristics of muscle illustrated in FIG. 1. The artificial muscle actuators are actuators with characteristics similar to the characteristics called viscoelasticity of muscle. As illustrated in FIG. 1, the muscle is modeled using a force generation element, an elasticity element and a viscosity element.

For the actuators $e_1$, $f_1$, $e_2$, $f_2$, $e_3$ and $f_3$ of FIG. 9, $u_{en}$ and $u_{fn}$ (n=1, 2, 3) are driving force command values for generating the driving force of the force generation elements. Furthermore, $k_{en}$, $k_{fn}$, $b_{en}$ and $b_{fn}$ (n=1, 2, 3) are elastic force constants and viscous force constants of the artificial muscle actuators. Angles of the first and second links 201 and 202, i.e. angles of the joints, are defined as $\theta_1$ and $\theta_2$. Inertia moments of the first and second links 201 and 202 are defined as $I_1$ and $I_2$. Lengths of the first and second links 201 and 202 are defined as $2\times l_1$ and $2\times l_2$. Mass of the first and second links 201 and 202 is defined as $m_1$ and $m_2$.

A length of the moment arm diameter, i.e. a length between the pivot center point of the first link 201 and the connection point of the actuators $e_1$ and $f_1$ at the pulley 203 and a length between the pivot center point of the second link 202 and the connection point of the actuators $e_2$ and $f_2$ at the second link 202, is defined as r.

When the elastic force constants and the viscous force constants of the muscles are defined as k and b in the present third embodiment, equations of motion are as in the following Formulas (19) and (20).

$$(m_1 l_1^2 + I_1 + 4m_2 l_1^2 + 4m_2 l_1 l_2 \cos\theta_2 + m_2 l_2^2 + I_2)\ddot{\theta}_1 + \qquad (19)$$
$$(m_2 l_2^2 + I_2 + 2m_2 l_1 l_2 \cos\theta_s)\ddot{\theta}_2 - 2m_2 l_1 l_2 (2\dot{\theta}_1 + \dot{\theta}_2)\sin\theta_2 \dot{\theta}_2 =$$
$$(u_{f1} - u_{e1})r - (u_{f1} + u_{e1})kr^2\theta_1 - (u_{f1} + u_{e1})br^2\dot{\theta}_1 +$$
$$(u_{f3} - u_{e3})r - (u_{f3} + u_{e3})kr^2(\theta_1 + \theta_2) - (u_{f3} + u_{e3})br^2(\dot{\theta}_1 + \dot{\theta}_2)$$

$$(m_2 l_2^2 + I_2 + 2m_2 l_1 l_2 \cos\theta_2)\ddot{\theta}_1 + (m_2 l_2^2 + I_2)\ddot{\theta}_2 + 2m_2 l_1 l_2 \sin\theta_2 \dot{\theta}_1^2 = \qquad (20)$$
$$(u_{f2} - u_{e2})r - (u_{f2} + u_{e2})kr^2\theta_2 - (u_{f2} + u_{e2})br^2\dot{\theta}_2 +$$
$$(u_{f3} - u_{e3})r - (u_{f3} + u_{e3})kr^2(\theta_1 + \theta_2) - (u_{f3} + u_{e3})br^2(\dot{\theta}_1 + \dot{\theta}_2)$$

(2) Control System Design

Figure 10:
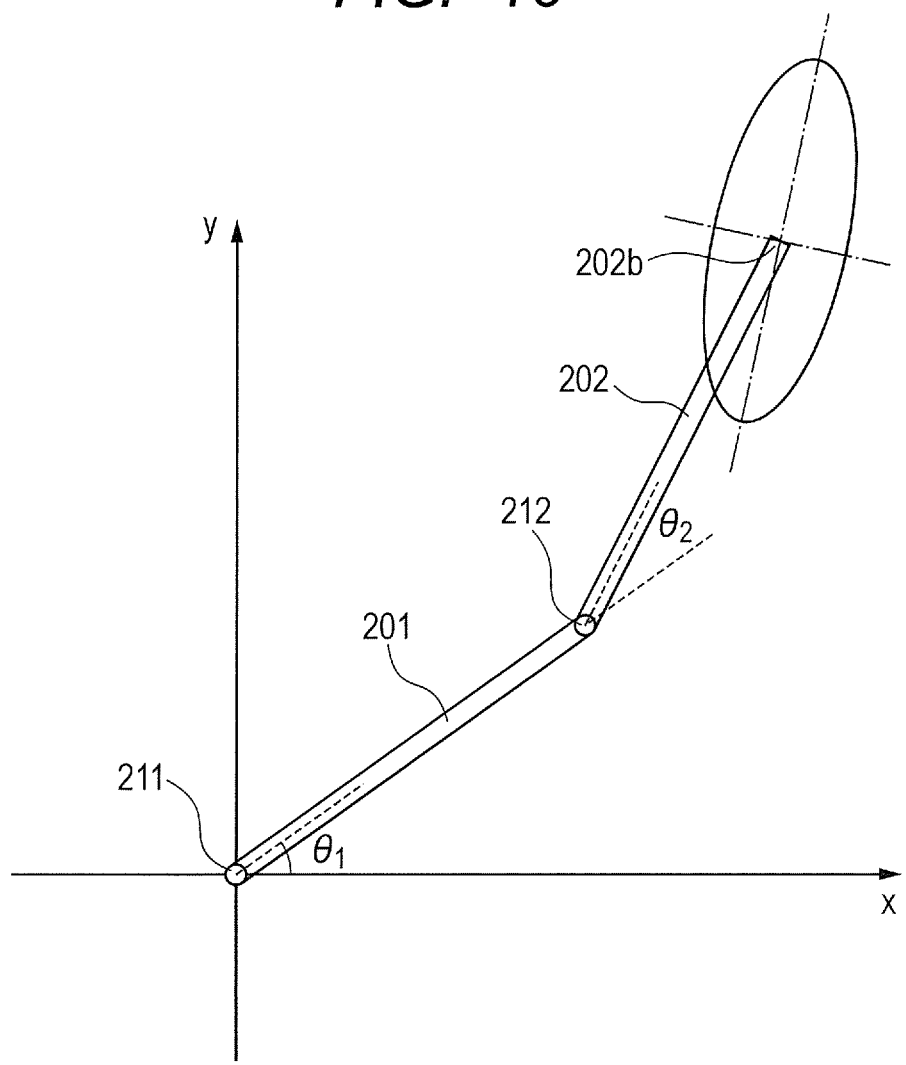
FIG. 10 is a diagram for describing a stiffness ellipse according to the third embodiment of the present invention.

The angle and the stiffness of the joint are simultaneously controlled in the first and second embodiments, and the angle and the stiffness of the joint are also simultaneously controlled using a two-degree-of-freedom control system in the present third embodiment. However, since the hand directly comes in contact with the outside world in the two-link manipulator, the control of the stiffness of the hand is important. The stiffness of the hand is expressed by a stiffness ellipse as illustrated in FIG. 10. The ellipse illustrates a distribution of the stiffness relative to each direction. The farther the distance between the hand and the ellipse, the higher the stiffness.

Figure 11:
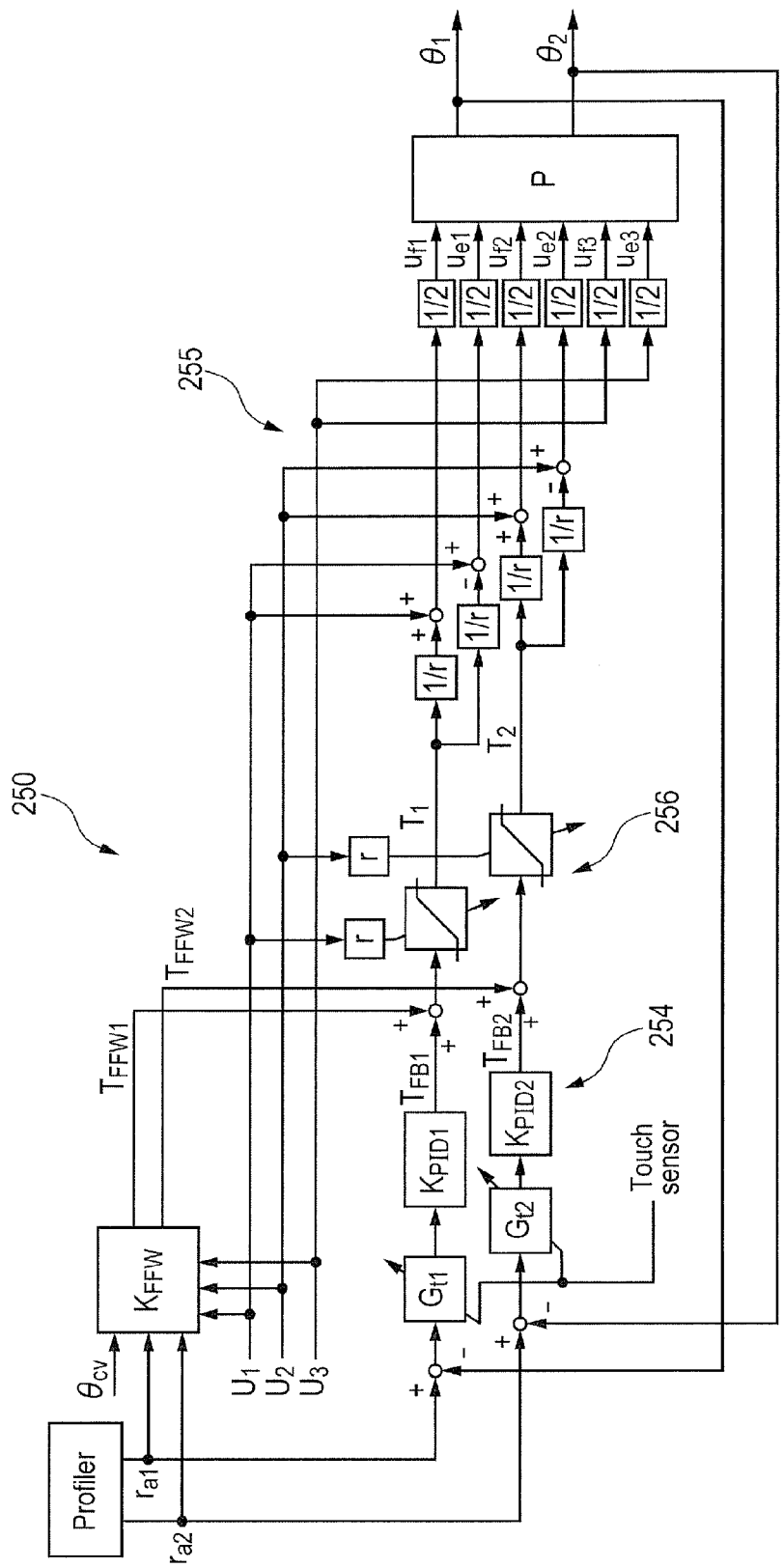
FIG. 11 is a block diagram of a control unit according to the third embodiment of the present invention.

FIG. 11 illustrates a block diagram of a control unit 250 of the present third embodiment. A block indicated by $K_{FFW}$ is the feedforward control system, and a design method will be illustrated below.

(2.1) Feedforward Control System

When the difference in the contractile force is defined as $T_n$ and the sum is defined as $U_n$ as in the first embodiment, the following can be formed.

$$(u_{fn} - u_{en})r = T_{FFWn} + T_{FBn} = T_n, n=1,2,3 \qquad (21)$$

$$u_{fn} + u_{en} = U_n, n=1,2,3 \qquad (22)$$

Here, $T_{FFWn}$ and $T_{FBn}$ denote torque command values provided by the feedforward control system and the feedback control system, respectively. In this section, $T_{FBn}=0$ is set to illustrate a delivery method of the feedforward control input.

When Formulas (19) and (20) are defined by $\theta_v = [\theta_1 \; \theta_2]^T$ and $T_v = [T_1+T_3 \; T_2+T_3]^T$ to write matrices, the following is formed.

$$M_m(\theta_v)\ddot{\theta}_v + C_m(\theta_v,\dot{\theta}_v)\dot{\theta}_v = -K_v(\theta_v\theta_{cv}) - C_v\dot{\theta}_v + T_v \qquad (23)$$

Here, $K_V$ and $C_V$ denote a stiffness matrix and a damping matrix based on the viscoelasticity of muscle, respectively, and are expressed as follows.

$$K_v = \begin{bmatrix} U_1+U_3 & U_3 \\ U_3 & U_2+U_3 \end{bmatrix} kr^2, \qquad (24)$$

$$C_v = \begin{bmatrix} U_1+U_3 & U_3 \\ U_3 & U_2+U_3 \end{bmatrix} br^2$$

Furthermore, $\theta_{cv}$ denotes a vector including neutral posture angles $\theta_{c1}$ and $\theta_{c2}$ based on the elastic force of muscle when the joint torque $T_1$ and $T_2$ do not act and is expressed as follows.

$$\theta_{cv} = [\theta_{c1} \theta_{c2}]^T \qquad (25)$$

The bi-articular simultaneous drive actuators can provide a difference between the driving force command values $u_{e3}$ and $u_{f3}$ to provide torque to the joint, as with the mono-articular drive actuators. However, the control of one link by a plurality of feedback control systems is redundant, and the design of the feedback control systems becomes complicated. Therefore, the bi-articular simultaneous drive actuators $e_3$ and $f_3$ are used to provide stiffness to the joint in the present third embodiment, and the difference $T_3$ in the contractile force $u_{e3}$ and $u_{f3}$ is set to $T_3=0$ (Formula (26)). As a result, it can be recognized that $T_1$ and $T_2$ provide torque to the joint and that $U_1$, $U_2$ and $U_3$ increase or decrease the stiffness and the viscosity relative to the joint. In the present third embodiment, the stiffness ellipse of the hand is taken into account to determine $U_1$, $U_2$ and $U_3$, and the details will be illustrated in a section 2.3.

The control unit 250 executes a torque command value calculation step 251, a determination step 252, a change process 253, a corrected torque command value calculation step 254 and a driving force command value calculation step 255. In the present third embodiment, the control unit 250 calculates the driving force command values $u_{en}$ and $u_{fn}$ of the actuators $e_n$ and $e_f$ necessary for the stiffness of the joints 211 and 212 to be equal to the target stiffness and for the angles of the joints 211 and 212 to follow the target trajectory. The control unit 250 controls the actuators $e_n$ and $f_n$ so that the driving force generated in the actuators $e_n$ and $f_n$ coincides with the driving force command values $u_{en}$ and $u_{fn}$.

The target trajectory relative to the joint angle $\theta_n$ (n=1, 2) is defined as $r_{an}$ (n=1, 2) to define as follows.

$$r_{av} = [r_{a1} r_{a2}]^T \qquad (27)$$

The angular velocity and the angular acceleration of the target trajectory are expressed as follows, respectively.

$$\dot{r}_{av}, \ddot{r}_{av}$$

The feedforward input $T_{FFW} = [T_{FFW1} \; T_{FFW2}]$ for the joint angle to follow the target trajectory is obtained as follows based on inverse dynamics.

$$T_{FFW} = M_m(r_{av})\ddot{r}_{av} + C_m(r_{av},\dot{r}_{av})\dot{r}_{av} + K_v(r_{av} - \theta_{cv}) + C_v\dot{r}_{av} \qquad (28)$$

As in the first embodiment, the satisfaction of the following condition indicating that the force is generated only in the contraction direction is checked.

$$|T_{FFWn}| < U_n r, n=1,2 \qquad (29)$$

(2.2) Two-Degree-of-Freedom Control System

PID control steps $K_{PID1}$ and $K_{PID2}$ as the corrected torque command value calculation step 254 in the feedback control system illustrated in FIG. 11 are executed. In the PID control steps $K_{PID1}$ and $K_{PID2}$, the control unit 250 calculates control input torque $T_{FB1}$ and $T_{FB2}$ for compensating differences between the joint angles $\theta_1$, $\theta_2$ and the target trajectories $r_{a1}$, $r_{a2}$.

As in the second embodiment, the control input $T_n$ (n=1, 2) is restricted as follows.

$$|T_n| < U_n r, n=1,2 \qquad (30)$$

The contractive force $u_{fn}$ and $u_{en}$ (n=1, 2) is expressed as follows.

$$u_{fn} = \frac{U_n + T_n/r}{2}, \qquad (31)$$

$$u_{en} = \frac{U_n - T_n/r}{2}$$

Since $T_3=0$, the contractile force $u_{e3}$ and $u_{f3}$ is expressed as follows as illustrated in the block diagram of FIG. 11.

$$u_{f3} = u_{e3} = U_3/2 \qquad (32)$$

Figure 12:
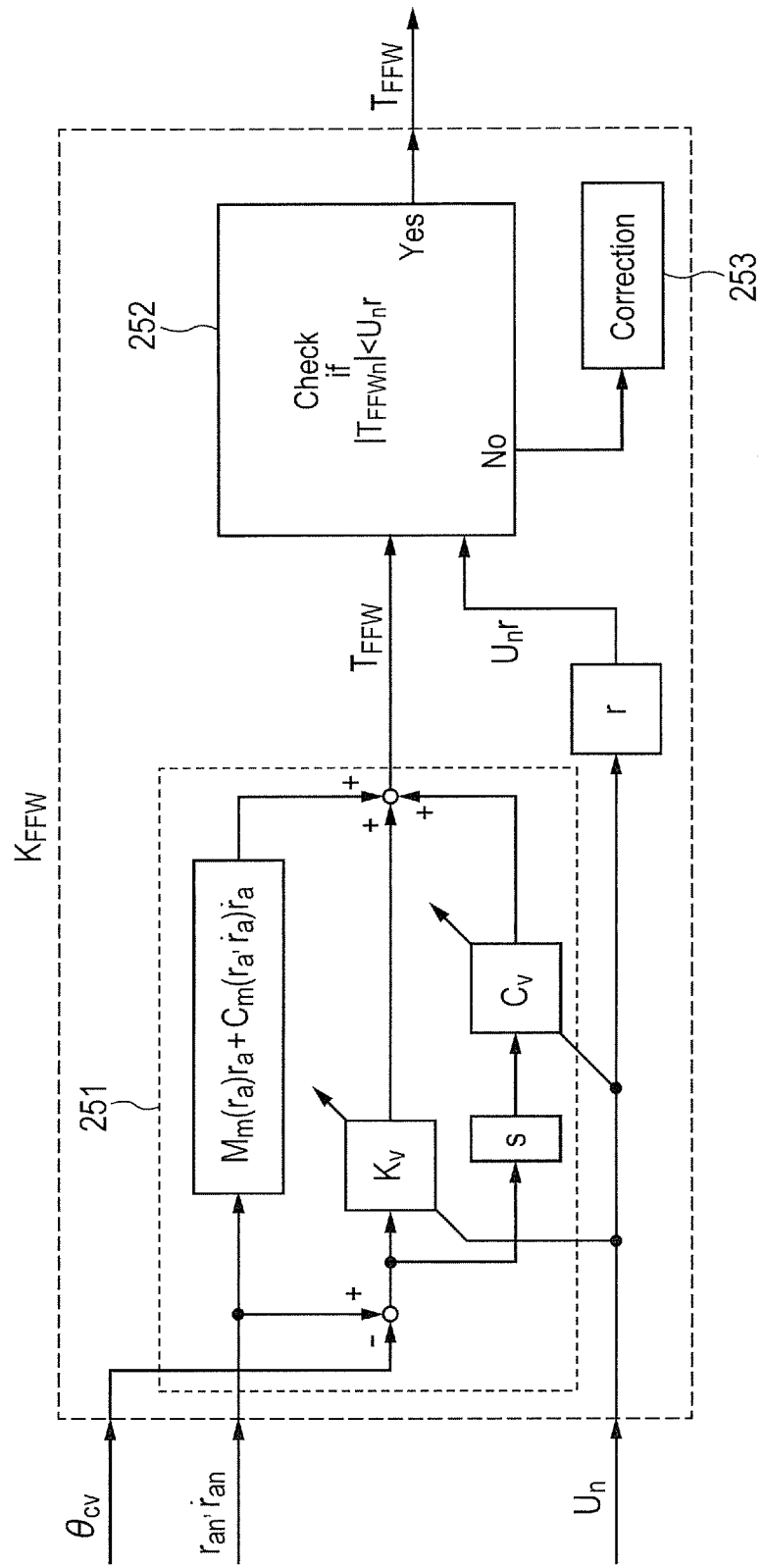
FIG. 12 is a block diagram of feedforward control of the control unit according to the third embodiment of the present invention.

FIG. 12 illustrates a block diagram of the feedforward control. In the torque command value calculation step 251, the control unit 250 uses the target stiffness, the target trajectory, the angular velocity of the target trajectory, and the angular acceleration of the target trajectory based on inverse dynamics of the links 201 and 202 to calculate the torque command value $T_{FFW}$ indicating torque necessary for the joints 211 and 212. Therefore, the control unit 250 calculates the joint stiffness command value $U_n$ from the target stiffness. The control unit 250 then uses the joint stiffness command value, the target trajectory, the angular velocity of the target trajectory, and the angular acceleration of the target trajectory to calculate the torque command value $T_{FFW}$ according to Formula (28) (torque command value calculation step).

In the determination step 252, the control unit 250 determines whether the driving force command values $u_{en}$ and $u_{fn}$ obtained using the torque command value $T_{FFW}$ calculated in the torque command value calculation step 251 and the target stiffness can be values 0 or greater (determination step).

A case of performing only the feedforward control by setting $T_{FBn}=0$ will be described. More specifically, $T_n = T_{FFWn}$.

In the driving force command value calculation step 255 (FIG. 11), if the control unit 250 determines that the driving force command values can be values 0 or greater in the determination step 252, the control unit 250 uses the target stiffness and the torque command value $T_n$ to calculate the driving force command values $u_{en}$ and $u_{fn}$ (driving force command value calculation step).

More specifically, if the control unit 250 determines that Formula (29) is satisfied, the control unit 250 calculates the driving force command values $u_{en}$ and $u_{fn}$ by Formula (31). As a result, the stiffness of the joints 211 and 212 coincides with target stiffness. At the same time, torque corresponding to the torque command values $T_1$ and $T_2$ is applied to the joints 211 and 212, and the angles $\theta_1$ and $\theta_2$ of the joints 211 and 212 follow the target trajectory.

In the change process 253, if the control unit 250 determines that at least one of the driving force command values can be a negative value in the determination step 252, the control unit 250 performs at least one of a change of increasing the target stiffness and a change of reducing the angular acceleration of the target trajectory (change step). After the execution of the change process 253, the control unit 250 returns to the execution of the torque command value calculation step 251 (change step).

More specifically, if the condition of Formula (29) is not satisfied, the control unit 250 uses, as in the first embodiment, the flow chart illustrated in FIG. 4 to change the following target stiffness and angular acceleration of the target trajectory.

$\ddot{r}_{a1}, \ddot{r}_{a2}$

When the feedback control is also performed along with the feedforward control, the control unit 250 executes the PID control steps $K_{PID1}$ and $K_{PID2}$ (corrected torque command value calculation step).

For the torque command value $T_n$, the control unit 250 uses a result obtained by adding the control input torque $T_{FBn}$ to the feedforward input $T_{FFWn}$. More specifically, the control unit 250 performs the computation of Formula (21). In that case, as in the second embodiment, the control unit 250 restricts the restriction process 256 by Formula (30) to obtain the contractile force $u_{fn}$ and $u_{en}$.

(2.3) Hand Stiffness Control

In the one-link manipulator of the first embodiment, the stiffness of the joint and the stiffness of the hand are the same. In the two-link manipulator with six muscles (three pairs), the stiffness of the hand is obtained by controlling the joint stiffness command values $U_1$, $U_2$ and $U_3$ as sums of the contractile force. For example, if the joint stiffness command values $U_1$, $U_2$ and $U_3$ are controlled by $$U_1 = U_2 = U_3 \tag{33},$$

it is known that the major axis of the stiffness ellipse faces the direction connecting the first joint 211 and the hand. In the present third embodiment, the joint stiffness command values $U_1$, $U_2$ and $U_3$ are newly obtained so that the major and minor axes of the stiffness ellipse of the hand are parallel to the x-y axis.

Minute displacements of the link tips caused by minute external force $\Delta F_x$ and $\Delta F_y$ parallel to the x-y axis are defined as $\Delta x_t$ and $\Delta y_t$. Minute rotation angles of the links caused by the minute external force $\Delta F_x$ and $\Delta F_y$ are defined as $\Delta \theta_1$ and $\Delta \theta_2$. When there is minute rotation, the actuators with the viscoelasticity of the muscle generate minute torque $\Delta T_{p1}$ and $\Delta T_{p2}$ on the links by the elastic force of the muscle, and the following formulas can be formed.

$$\Delta T_{p1} = \{U_1 \Delta \theta_1 + U_3 (\Delta \theta_1 + \Delta \theta_2)\} kr^2 \tag{34}$$

$$\Delta T_{p2} = \{U_2 \Delta \theta_2 + U_3 (\Delta \theta_1 + \Delta \theta_2)\} kr^2 \tag{35}$$

This is written in a matrix, and the relationship between the minute angle and the torque can be formed as follows using the stiffness matrix $K_v$ used in the section 2.1.

$$\begin{bmatrix} \Delta T_{p1} \\ \Delta T_{p2} \end{bmatrix} = K_v \begin{bmatrix} \Delta \theta_1 \\ \Delta \theta_2 \end{bmatrix} \tag{36}$$

A Jacobian matrix J is introduced here.

$$J(\theta_1, \theta_2) = \begin{bmatrix} -2l_1 \sin\theta_1 - 2l_2 \sin(\theta_1 + \theta_2) & -2l_2 \sin(\theta_1 + \theta_2) \\ 2l_1 \cos\theta_1 + 2l_2 \cos(\theta_1 + \theta_2) & 2l_2 \cos(\theta_1 + \theta_2) \end{bmatrix} \tag{37}$$

Consequently, a relationship between the minute hand displacement and the minute external force can be expressed by a compliance matrix $J_s$.

$$\begin{bmatrix} \Delta x_t \\ \Delta y_t \end{bmatrix} = -J(\theta_1, \theta_2) K_s^{-1} J^T(\theta_1, \theta_2) \begin{bmatrix} \Delta F_x \\ \Delta F_y \end{bmatrix} \tag{38}$$
$$= J_s(\theta_1, \theta_2, U_1, U_2, U_3) \begin{bmatrix} \Delta F_x \\ \Delta F_y \end{bmatrix}$$

Since an inverse matrix of the compliance matrix indicates the stiffness, the condition that the stiffness ellipse is parallel to the x-y axis is as follows.

$$J_s(1,2) = J_c(2,1) = 0 \tag{39}$$

This equation is solved for the sum $U_3$ of the contractile force to obtain the following.

$$U_3 = -\frac{U_2(l_2^2 \sin 2(\theta_1 + \theta_2) + 2l_1 l_2 \sin(2\theta_1 + \theta_2) + l_1^2 \sin 2\theta_1) + U_1 l_2^2 \sin 2(\theta_1 + \theta_2)}{l_1^2 \sin 2\theta_1} \tag{40}$$

(2.4) Trajectory Design

Figure 13A:
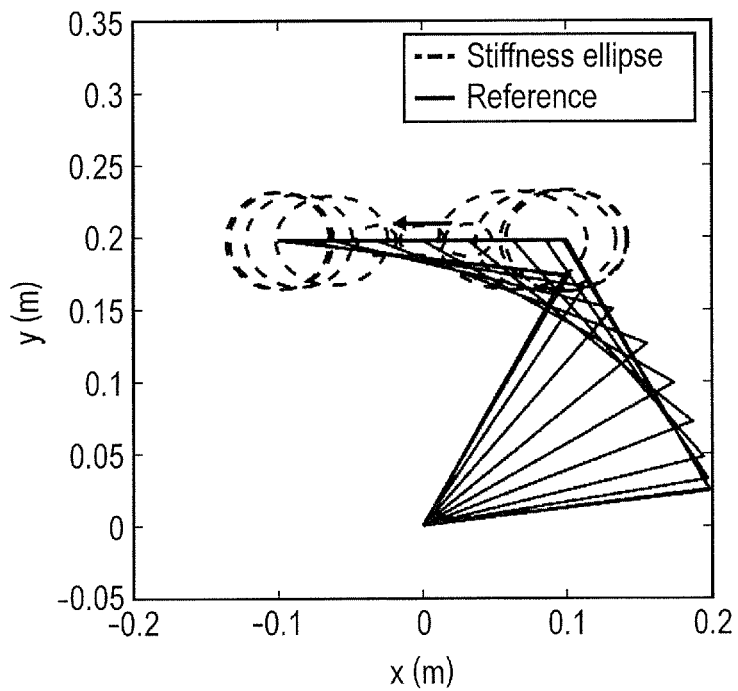
FIG. 13A is a diagram illustrating a trajectory design according to the third embodiment of the present invention.

In the present third embodiment, the target trajectory is set so that the hand of the manipulator is driven parallel to the x axis as illustrated by a solid line of FIG. 13A, in an arrow direction of FIG. 13A. As in the first embodiment, the acceleration section, the constant velocity section, and the deceleration section are included. The target trajectories $r_{a1}$ and $r_{a2}$ relative to the joint angle are obtained from the hand trajectory based on inverse kinematics.

Figure 13B:
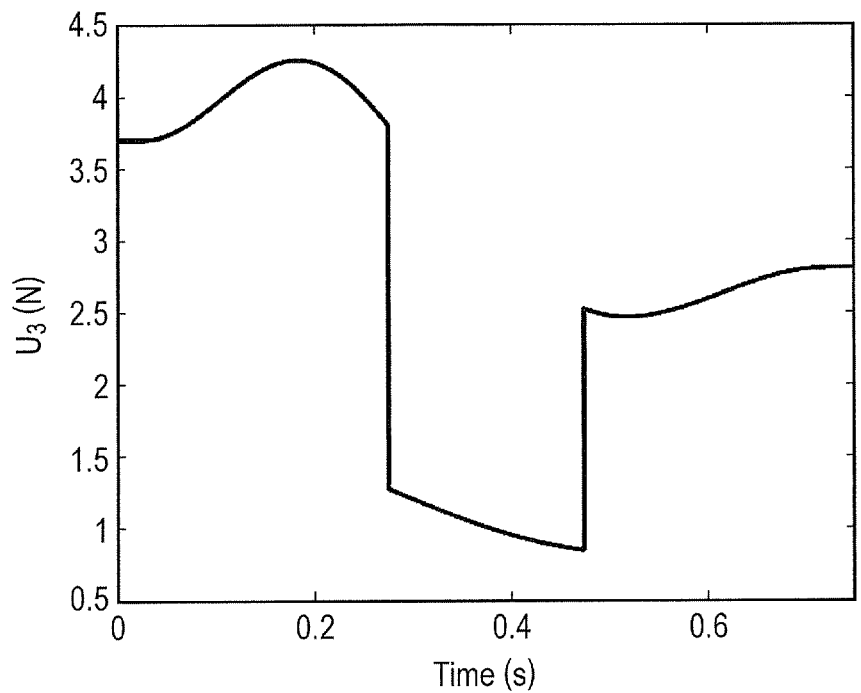
FIG. 13B is a diagram illustrating a trajectory design according to the third embodiment of the present invention.

As illustrated by a dashed line in FIG. 13A, the target stiffness is set to form a hand stiffness ellipse that is always parallel to the x-y axis. The stiffness ellipse of FIG. 13A is illustrated every $t_{fin}/10$ seconds. As in the first embodiment, the stiffness is set to be high at the acceleration and deceleration sections and low at the constant velocity. Sums of the contractile force of the mono-articular muscle actuators at the acceleration and deceleration sections are defined as $U_{1max}$ and $U_{2max}$, and sums of the contractile force of the mono-articular muscle actuators at the constant velocity section are defined as $U_{1min}$ and $U_{2min}$. A sum $U_3$ of the contractile force of the bi-articular simultaneous drive actuators is delivered by Formula (40) using $U_{1max}$ and $U_{2max}$ at the acceleration and deceleration sections and using $U_{1min}$ and $U_{2min}$ at the constant velocity. FIG. 13B illustrates $U_3$ obtained based on the following.

$$U_{1max} = 3, U_{2max} = 1.71, U_{1min} = 1, U_{2min} = 0.57 \tag{41}$$

Although the trajectory including the acceleration section, the constant velocity section and the deceleration section is used in the present third embodiment, a trajectory, such as a minimum jerk trajectory, that does not include the constant velocity section may also be used. Besides, the target stiffness may be constant if the efficiency of the drive is not taken into account.

(3) Simulation

A simulation using the control system of the previous section is performed. The physical parameters of the first link 201 and the second link 202 are the same. The link length is 0.2 m, the inertia moment of the link is $I_1=I_2=1.3\times10^{-3}$ kgm$^2$, the moment arm diameter is 0.05 m, and the elastic force and viscous force constants are k=12 and b=0.003. For the target trajectory, the start time of the constant velocity section is $t_a$=0.2747 sec, the end time of the constant velocity section is $t_b$=0.4746 sec, and the positioning end time is $t_{fin}$=0.75 sec. The neutral posture angles $\theta_{c1}$ and $\theta_{c2}$ based on the elastic force when the joint torque $T_1$ and $T_2$ does not act are joint angles at the halfway point of the hand trajectory, which are $\theta_{c1}$=29.7 deg and $\theta_{c2}$=120.7 deg. The sums $U_1$, $U_2$ and $U_3$ of the contractile force of the artificial muscle actuators are controlled so that the stiffness ellipse of the hand is horizontal to the x-y axis. As in the second embodiment, the inertia moments are defined as $I_1$ and $I_2$ in the generation of the feedforward input to verify the identification error of the model in the two-degree-of-freedom control system in the present third embodiment. In the simulation, the inertia moments of the links are $I_1'$=1.1I1 and $I_2'$=1.1I2.

Figure 14A:
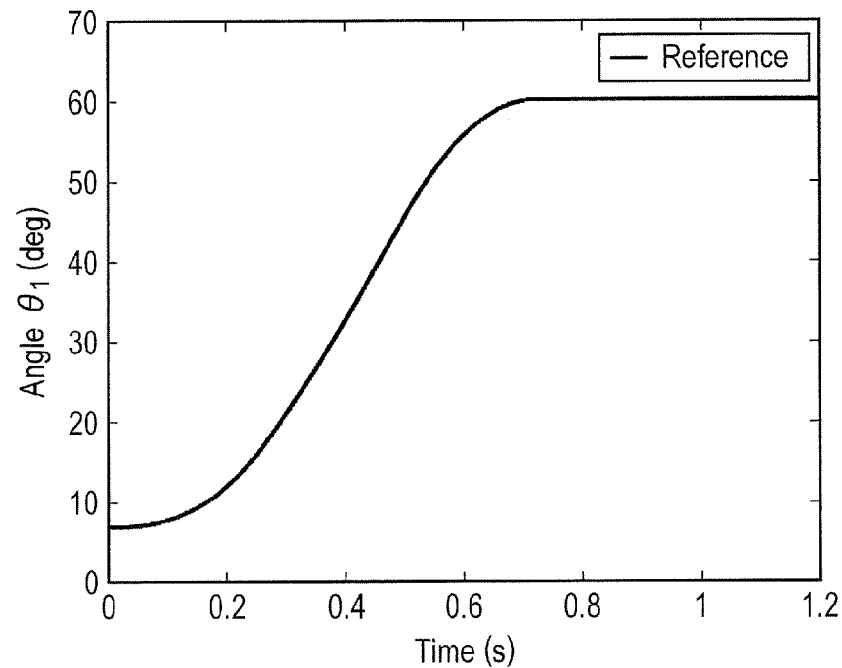
FIG. 14A is a diagram illustrating a simulation result according to the third embodiment of the present invention.
Figure 14B:
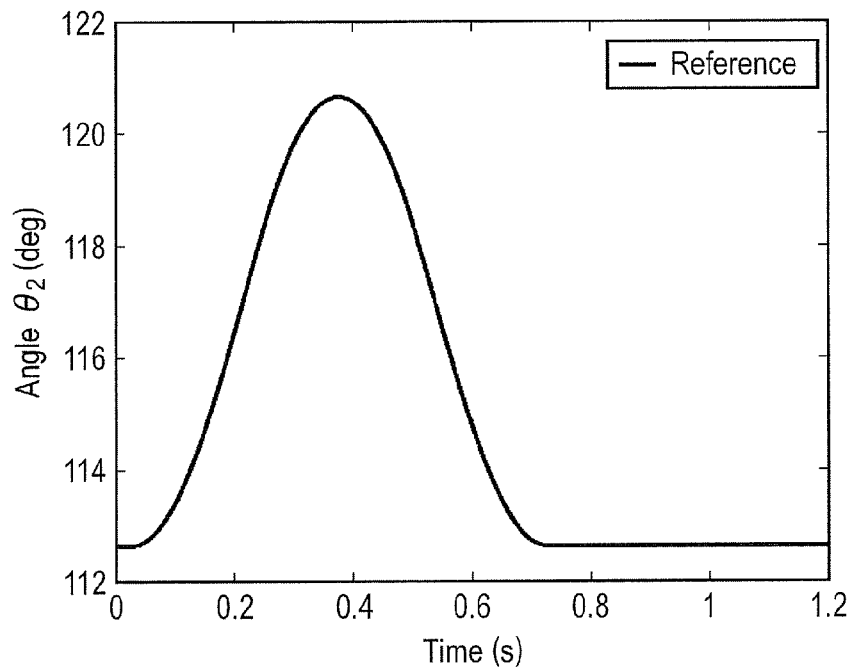
FIG. 14B is a diagram illustrating a simulation result according to the third embodiment of the present invention.
Figure 15A:
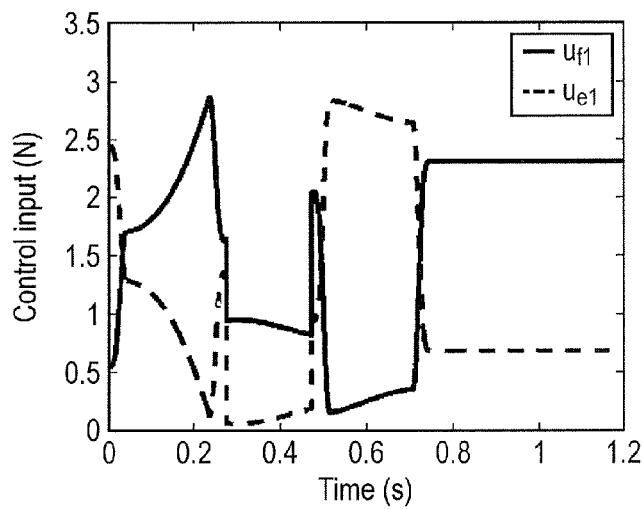
FIG. 15A is a diagram illustrating a simulation result according to the third embodiment of the present invention.
Figure 15B:
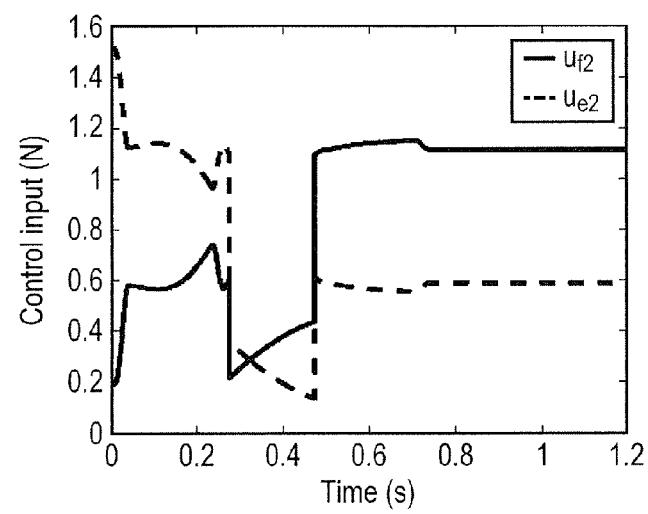
FIG. 15B is a diagram illustrating a simulation result according to the third embodiment of the present invention.
Figure 15C:
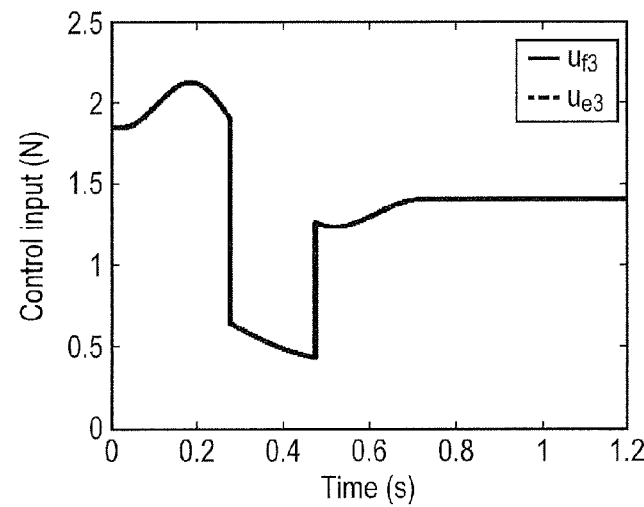
FIG. 15C is a diagram illustrating a simulation result according to the third embodiment of the present invention.
Figure 16A:
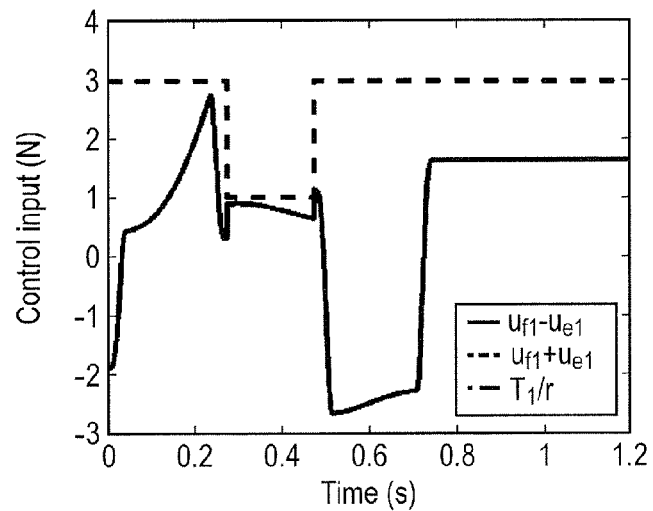
FIG. 16A is a diagram illustrating a simulation result according to the third embodiment of the present invention.
Figure 16B:
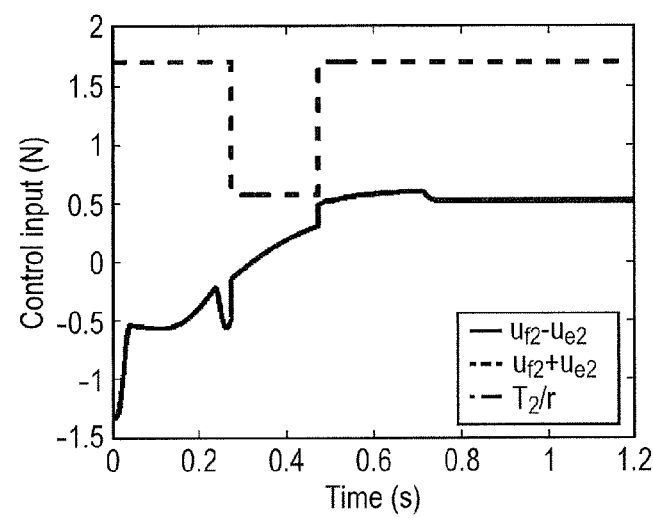
FIG. 16B is a diagram illustrating a simulation result according to the third embodiment of the present invention.
Figure 16C:
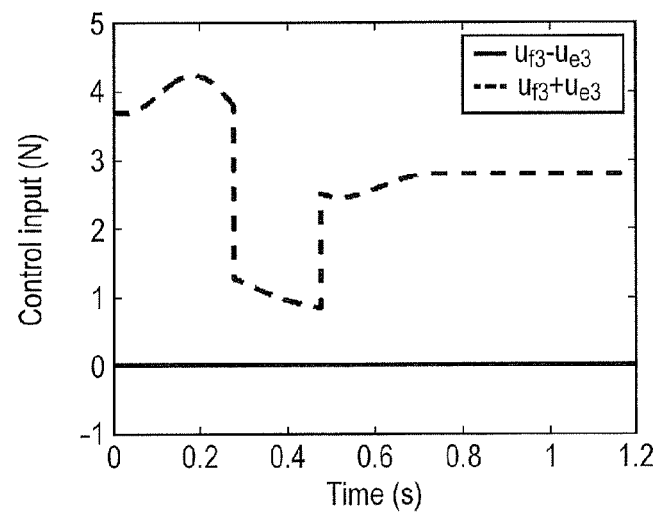
FIG. 16C is a diagram illustrating a simulation result according to the third embodiment of the present invention.
Figure 17A:
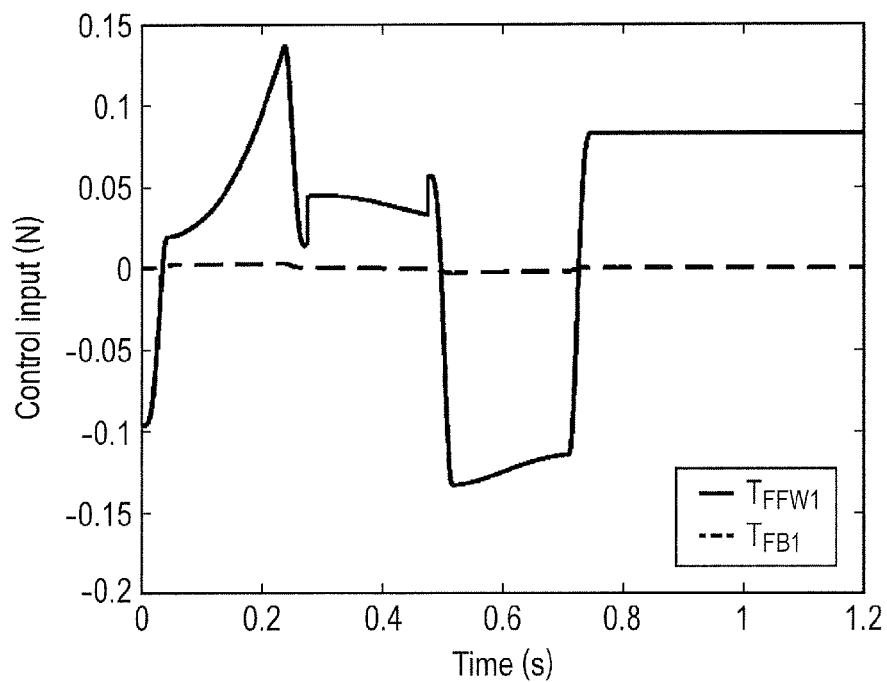
FIG. 17A is a diagram illustrating a simulation result according to the third embodiment of the present invention.
Figure 17B:
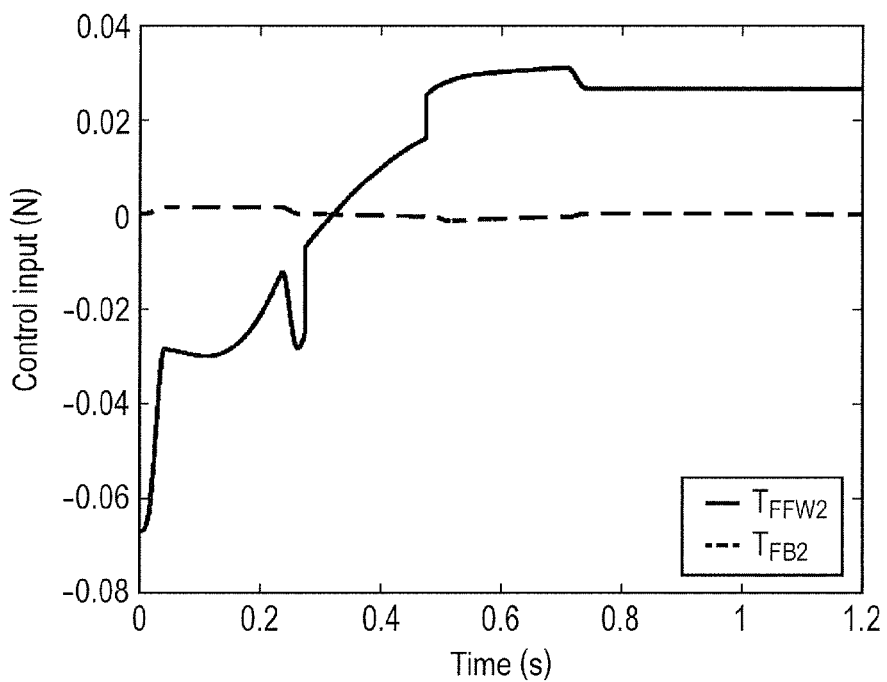
FIG. 17B is a diagram illustrating a simulation result according to the third embodiment of the present invention.

FIGS. 14A and 14B illustrate the joint angles $\theta_1$ and $\theta_2$ of the first and second links by solid lines and illustrate the target trajectories $r_{a1}$ and $r_{a2}$ by dashed lines. FIGS. 15A to 15C illustrate responses of the contractile force $u_{f1}$, $u_{f2}$ and $u_{f3}$ by solid lines and illustrate responses of the contractile force $u_{e1}$, $u_{e2}$ and $u_{e3}$ by dashed lines. FIGS. 16A to 16C illustrate differences in the contractile force $u_{en}$ and $u_{fn}$ (n=1, 2, 3) by solid lines, sums by dashed lines, and responses of $T_n/r$ (n=1, 2) by alternate long and short dash lines. FIG. 17A illustrates $T_{FFW1}$ and $T_{FB1}$, and FIG. 17B illustrates $T_{FFW2}$ and $T_{FB2}$ by solid lines and dashed lines, respectively.

It can be recognized from FIGS. 14A and 14B that the joint angles indicated by the solid lines overlap with the trajectories indicated by the dashed lines and that the links follow the target trajectories. As in the second embodiment, this is because the feedback control input compensates the model errors as illustrated by the dashed lines of FIGS. 17A and 17B. It can be recognized from FIG. 15A that the contractile force $u_{e1}$ and $u_{f1}$ satisfy the characteristic that the contractile force of the artificial muscle is a positive value, because the control input $T_1$ of the two-degree-of-freedom control system is distributed based on the conditions illustrated in Formulas (30) and (31). It can be recognized from FIG. 15B that the contractile force $u_{e2}$ and $u_{f2}$ similarly indicates positive values. Based on FIG. 15C, the contractile force $u_{e3}$ and $u_{f3}$ is $U_3/2$.

In FIG. 16A, $u_{f1}-u_{e1}$ indicated by the solid line overlaps with $T_1/r$ indicated by the alternate long and short dash line, and the condition of Formula (21) is satisfied. It can also be recognized that $u_{f1}+u_{e1}=U_1$ indicated by the dashed line is $U_{1max}$ at the acceleration and deceleration sections and is $U_{1min}$ at the constant velocity, as set in the section 2.4. Similarly, $u_{f2}-u_{e2}$ indicated by the solid line overlaps with $T_2/r$ indicated by the alternate long and short dash line in FIG. 16B, and the condition of Formula (21) is satisfied. It can also be recognized that $u_{f2}+u_{e2}=U_2$ indicated by the dashed line is $U_{2max}$ at the acceleration and deceleration sections and is $U_{2min}$ at the constant velocity. In FIG. 16C, $u_{f3}-u_{e3}$ indicated by the solid line is 0, and the condition of Formula (26) is satisfied. It can also be recognized that $u_{f3}+u_{e3}=U_3$ indicated by the dashed line coincides with the target value illustrated in FIG. 13B.

Since the stiffness of each antagonistic pair is controlled at the target value, it can be recognized that the stiffness ellipse of the hand is controlled to be parallel with the x-y axis in the target trajectory. According to the two-degree-of-freedom control system of the present third embodiment, it can be recognized that the stiffness of the hand can be controlled by the elasticity of six muscles (three pairs) while realizing the following of the target trajectory, even if there is an identification error in the model.

The present invention is not limited to the embodiments described above, and a person with an ordinary skill in the field can make many modifications within the technical scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-028613, filed Feb. 13, 2012, which is hereby incorporated by reference herein in its entirety.

What is claimed is:

1. A control method of a robot apparatus, the robot apparatus comprising: a link pivotally connected to a base body through a joint; and a pair of actuators that generate driving force for pulling the link in opposite directions relative to the base body to provide torque to the joint based on a difference in the driving force and to provide stiffness to the joint based on a sum of the driving force, the robot apparatus causing the stiffness of the joint to coincide with target stiffness, the robot apparatus obtaining each driving force command value of each of the actuators necessary for a joint angle of the joint to follow a target trajectory, the robot apparatus controlling each of the actuators so that the driving force generated in each of the actuators coincides with each of the driving force command values, the control method comprising:

a torque command value calculation step of using the target stiffness, the target trajectory, angular velocity of the target trajectory, and angular acceleration of the target trajectory to calculate a torque command value indicating the torque necessary for the joint based on inverse dynamics of the link;

a determination step of determining whether each of the driving force command values, which is obtained using the torque command value calculated in the torque command value calculation step and using the target stiffness, is a value 0 or greater;

a change step of performing at least one of a change of increasing the target stiffness and a change of reducing the angular acceleration of the target trajectory if it is determined that at least one of the driving force command values is a negative value in the determination step and returning to the torque command value calculation step; and a driving force command value calculation step of using the target stiffness and the torque command value to calculate each of the driving force command values if it is determined that each of the driving force command values is a value 0 or greater in the determination step.

2. The control method of the robot apparatus according to claim 1, the control method further comprising a corrected torque command value calculation step of calculating a corrected torque command value for compensating a difference between the angle of the joint and the target trajectory, wherein in the driving force command value calculation step, a result obtained by adding the corrected torque command value obtained in the corrected torque command value calculation step to the torque command value obtained in the torque command value calculation step is used as the torque command value used for the calculation of each of the driving force command values.

3. A robot apparatus comprising:

a link pivotally connected to a base body through a joint;

a pair of actuators that generate driving force for pulling the link in opposite directions relative to the base body to provide torque to the joint based on a difference in the driving force and to provide stiffness to the joint based on a sum of the driving force; and a control unit that causes the stiffness of the joint to coincide with target stiffness and that obtains each driving force command value of each of the actuators necessary for a joint angle of the joint to follow a target trajectory to control each of the actuators so that the driving force generated in each of the actuators coincides with each of the driving force command values, wherein the control unit executes:

a torque command value calculation process of using the target stiffness, the target trajectory, angular velocity of the target trajectory, and angular acceleration of the target trajectory to calculate a torque command value indicating the torque necessary for the joint based on inverse dynamics of the link;

a determination process of determining whether each of the driving force command values, which is obtained using the torque command value calculated in the torque command value calculation process and using the target stiffness, is values 0 or greater;

a change process of performing at least one of a change of increasing the target stiffness and a change of reducing the angular acceleration of the target trajectory if it is determined that at least one of the driving force command values is a negative value in the determination process and returning to the torque command value calculation process; and a driving force command value calculation process of using the target stiffness and the torque command value to calculate each of the driving force command values if it is determined that each of the driving force command values is a value 0 or greater in the determination process.

4. The robot apparatus according to claim 3, wherein the control unit executes a corrected torque command value calculation process of calculating a corrected torque command value for compensating a difference between the angle of the joint and the target trajectory, and in the driving force command value calculation process, uses a result obtained by adding the corrected torque command value obtained in the corrected torque command value calculation process to the torque command value obtained in the torque command value calculation process as the torque command value used for the calculation of each of the driving force command values.

* * * * *